(12) United States Patent
Rokeby-Thomas

(10) Patent No.: US 8,602,718 B2
(45) Date of Patent: Dec. 10, 2013

(54) TRANSVERSE-AXIS TURBINE WITH TWISTED FOILS

(75) Inventor: Andrew Byron Rhys Rokeby-Thomas, Salt Spring Island (CA)

(73) Assignee: ART Turbine Inc., Salt Spring Island (CA)

(*) Notice: Subject to any disclaimer, the term of this patent is extended or adjusted under 35 U.S.C. 154(b) by 903 days.

(21) Appl. No.: 12/672,745

(22) PCT Filed: Aug. 8, 2008

(86) PCT No.: PCT/CA2008/001446
§ 371 (c)(1),
(2), (4) Date: Feb. 9, 2010

(87) PCT Pub. No.: WO2009/018666
PCT Pub. Date: Feb. 12, 2009

(65) Prior Publication Data
US 2011/0027087 A1 Feb. 3, 2011

Related U.S. Application Data

(60) Provisional application No. 60/954,747, filed on Aug. 8, 2007.

(51) Int. Cl.
*F03D 3/00* (2006.01)
(52) U.S. Cl.
USPC .............................. 415/4.2; 415/4.4; 415/71
(58) Field of Classification Search
USPC .............. 416/4.1, 4.2, 4.3, 4.4, 4.5, 176, 242;
415/4.1, 4.2, 4.3, 4.4, 4.5, 176, 242
See application file for complete search history.

(56) References Cited

U.S. PATENT DOCUMENTS

| 1,100,332 | A | | 6/1914 | Smith |
| 1,766,765 | A | | 6/1930 | Savonius |
| 1,835,018 | A | | 12/1931 | Darrieus |
| 1,892,182 | A | * | 12/1932 | Thayer .......................... 416/176 |
| 3,941,504 | A | | 3/1976 | Snarbach |
| 4,293,274 | A | | 10/1981 | Gilman |
| 4,365,934 | A | | 12/1982 | Mason |

(Continued)

FOREIGN PATENT DOCUMENTS

| GB | 2 386 161 A | 9/2003 |
| WO | WO 2007/141367 A1 | 12/2007 |
| WO | WO 2008/086944 A2 | 7/2008 |

OTHER PUBLICATIONS

International Search Report dated Oct. 30, 2008 (Three (3) pages).

(Continued)

*Primary Examiner* — Edward Look
*Assistant Examiner* — Maxime Adjagbe
(74) *Attorney, Agent, or Firm* — Crowell & Moring LLP

(57) ABSTRACT

A turbine, suitable for use as a water or wind turbine, for generating rotary motion from fluid flow wherein the axis of rotation of the turbine is transverse to the direction of flow. The turbine has two foils, which may meet at the axis of rotation, and the turbine is helical and tapered. The turbine has a quasi-conical base. The non-mount end of the turbine is preferably tilted downstream with the turbine axis of rotation in the range of about 5° to 15° from perpendicular to the flow direction.

21 Claims, 37 Drawing Sheets

(56) References Cited

U.S. PATENT DOCUMENTS

| | | | |
|---|---|---|---|
| 5,405,246 A | 4/1995 | Goldberg | |
| 6,113,350 A | 9/2000 | Liu | |
| 6,428,275 B1 | 8/2002 | Jaakkola | |
| 7,040,859 B2 | 5/2006 | Kane | |
| 7,132,760 B2 | 11/2006 | Becker | |
| 2004/0061337 A1 | 4/2004 | Becker | |
| 2004/0219019 A1* | 11/2004 | Taylor et al. | 416/132 B |
| 2004/0247438 A1* | 12/2004 | McCoin | 416/132 B |
| 2006/0257240 A1 | 11/2006 | Naskali et al. | |
| 2006/0263201 A1 | 11/2006 | Harman | |
| 2007/0029807 A1 | 2/2007 | Kass | |
| 2007/0104582 A1 | 5/2007 | Rahai et al. | |
| 2007/0258806 A1 | 11/2007 | Hart | |
| 2008/0095608 A1 | 4/2008 | Boatner | |
| 2008/0191487 A1 | 8/2008 | Morgan | |

OTHER PUBLICATIONS

Corresponding European Search Report dated Sep. 27, 2010 (Two (2) pages).
Correspondence to Drew Rokeby Thomas regarding the Patent Search for the "Art Turbine" Wind Turbine dated Feb. 5, 2007 (Eight (8) pages).

* cited by examiner

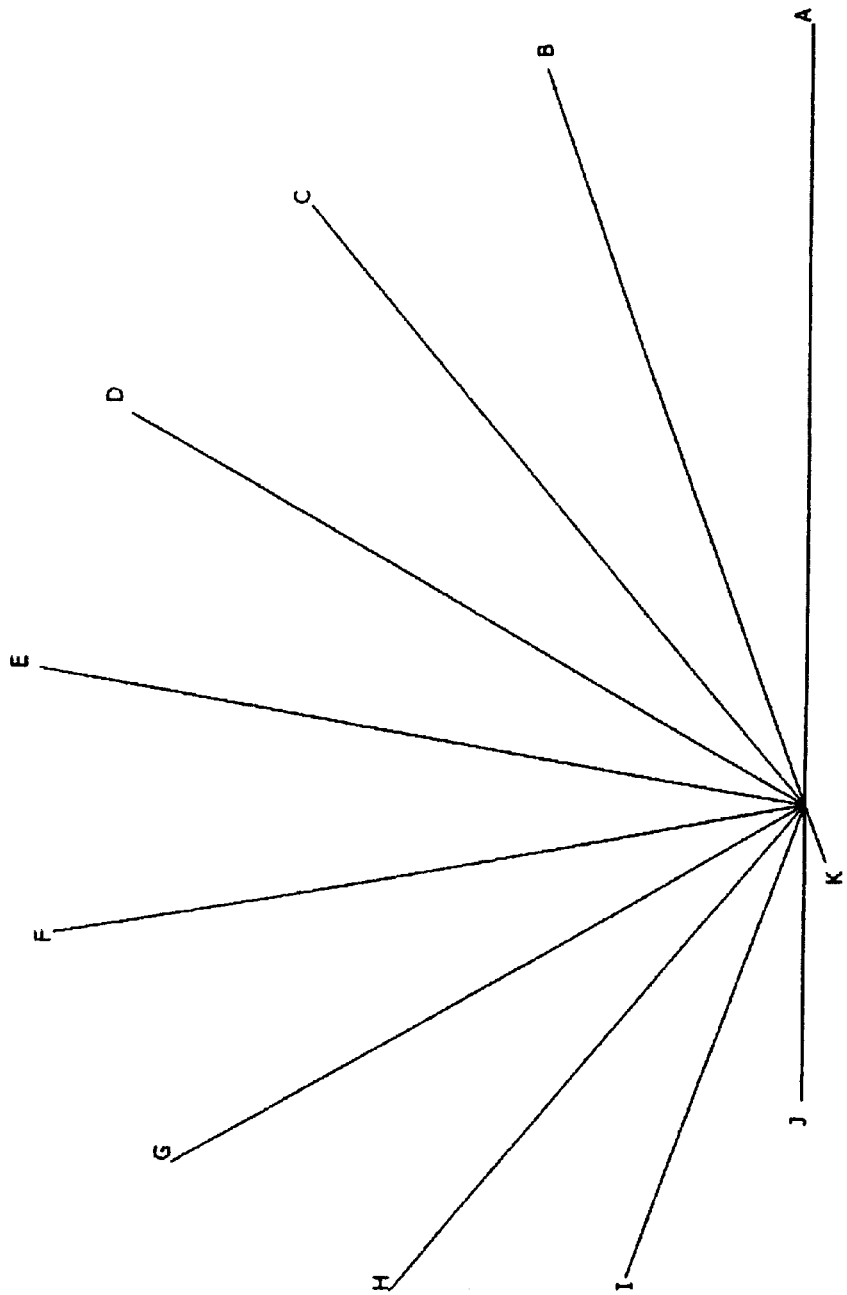

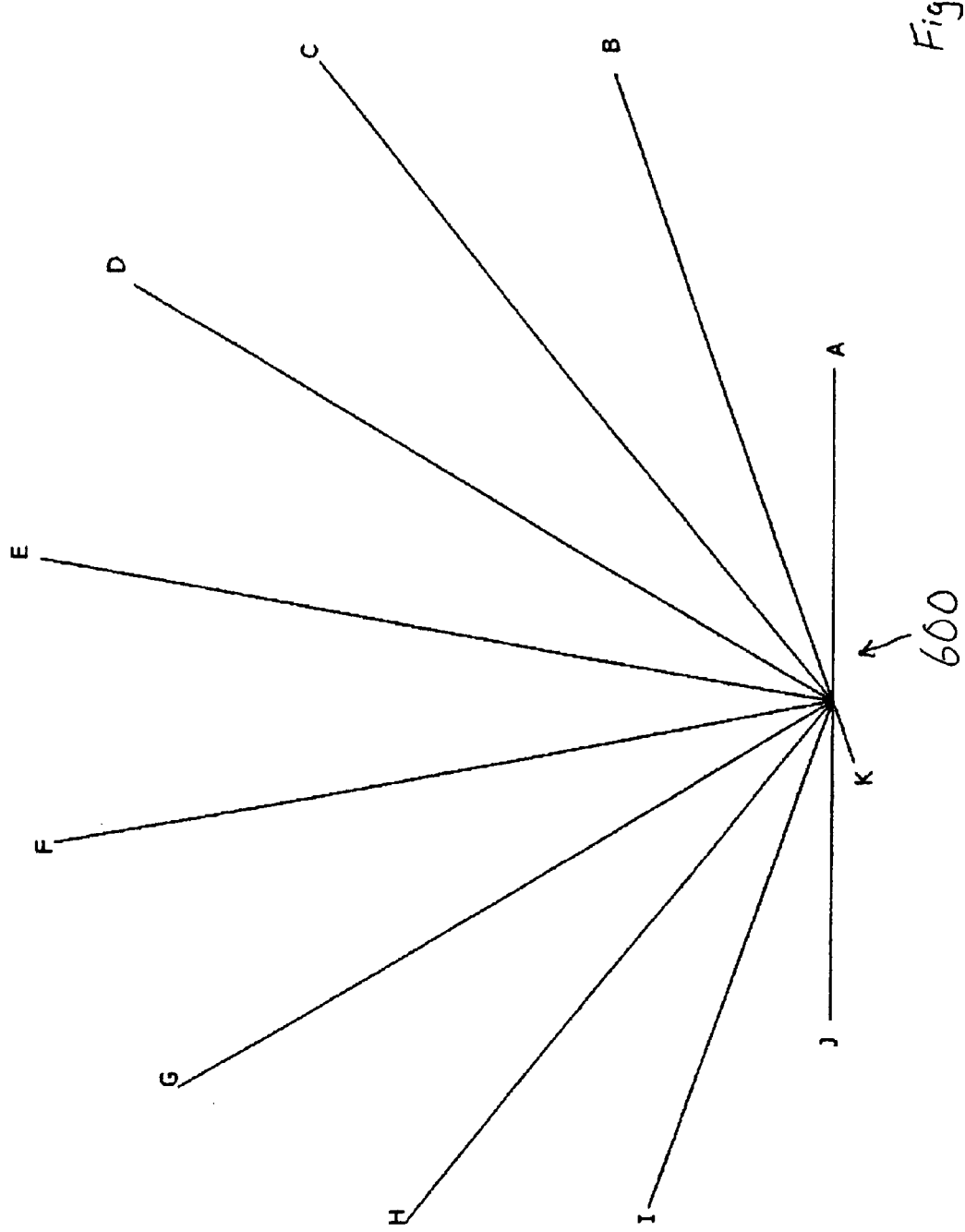

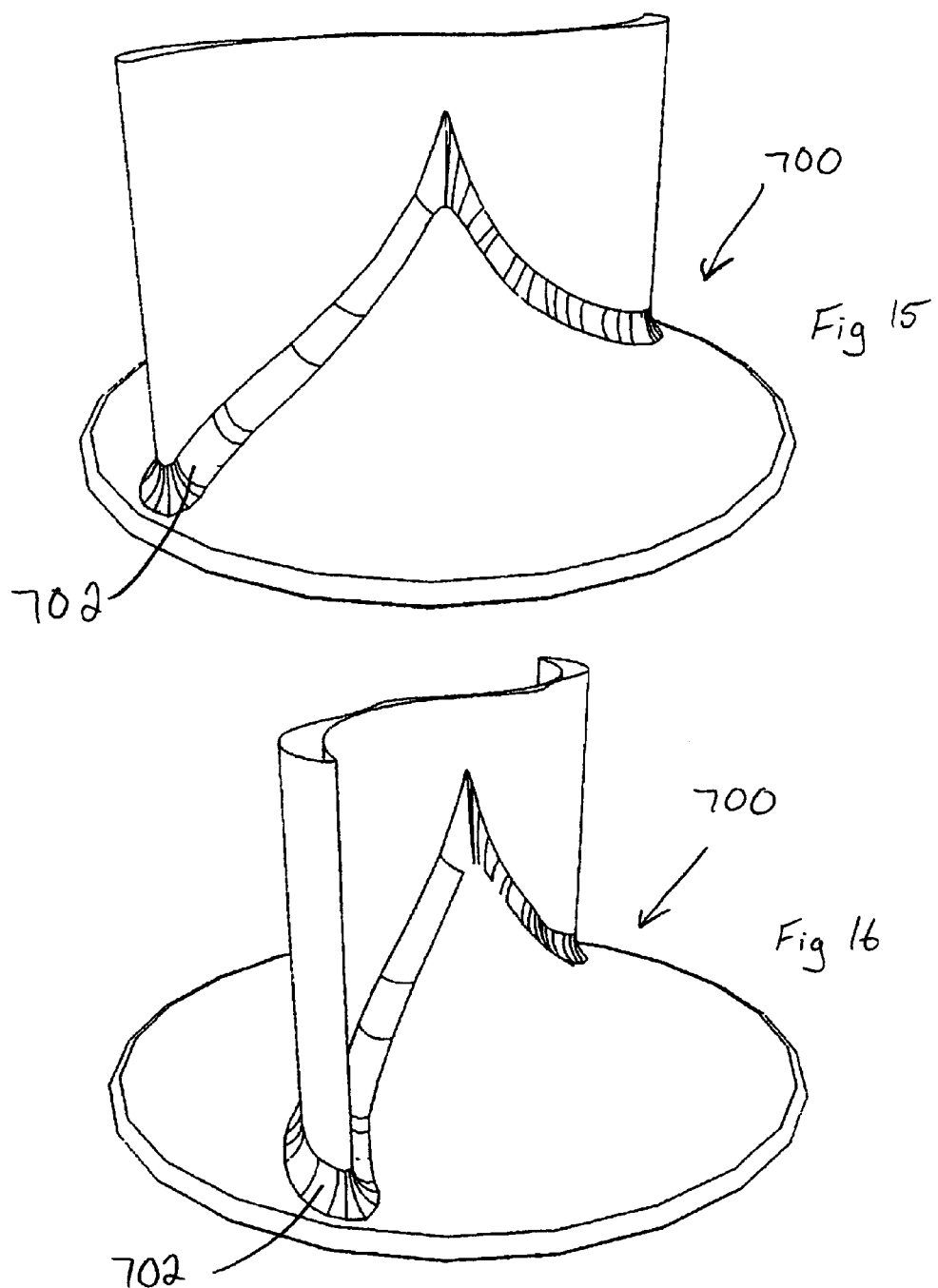

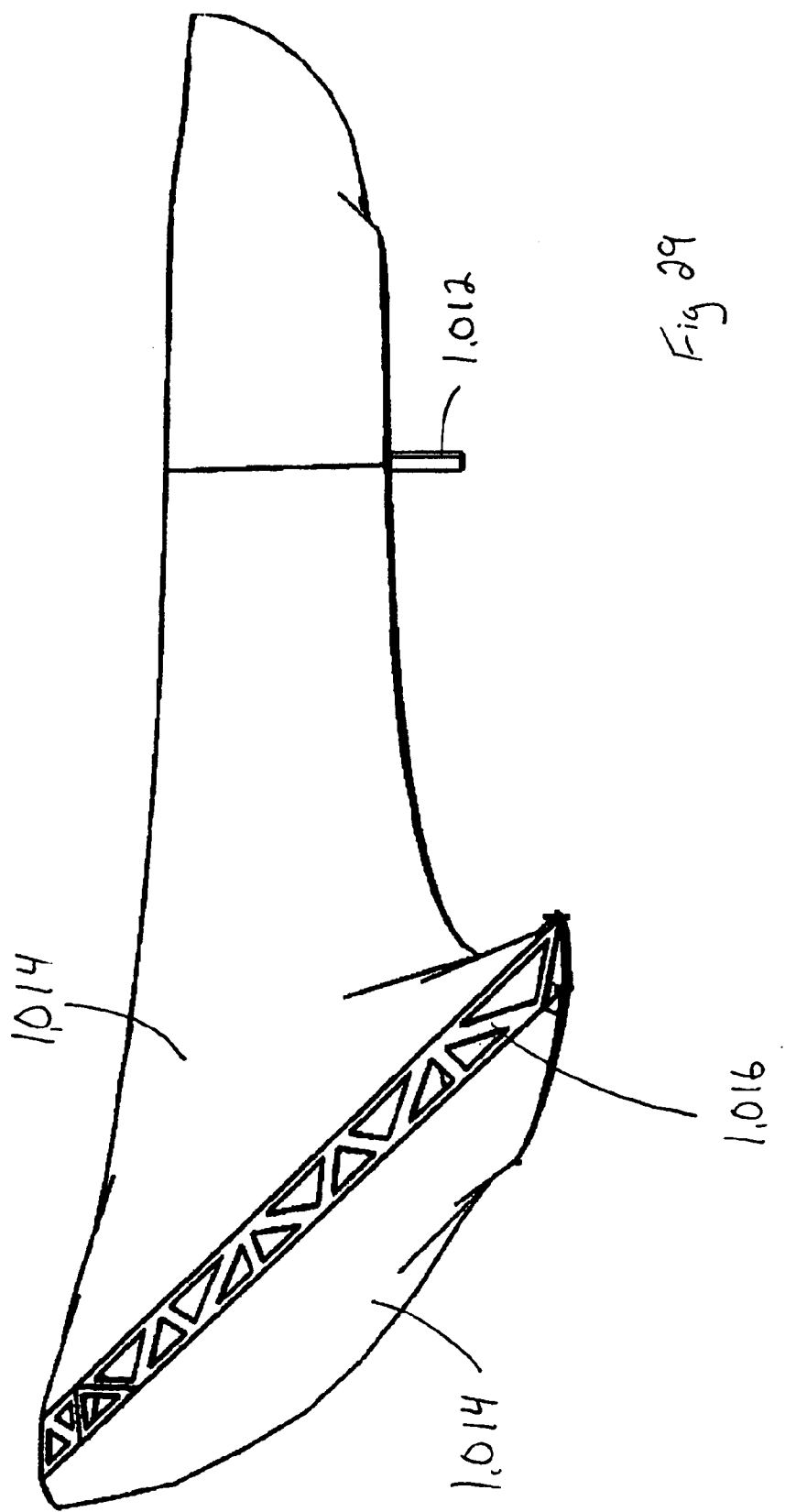

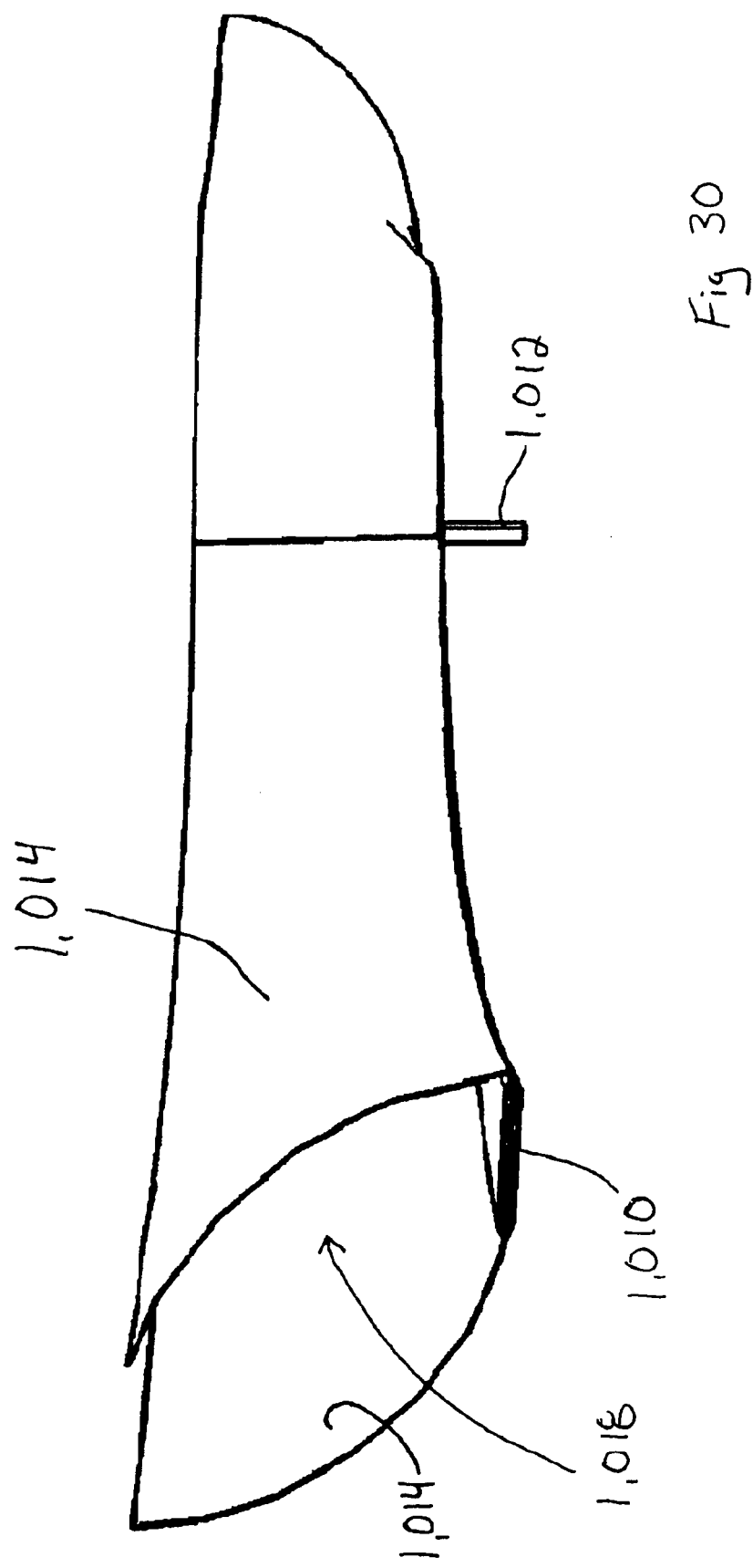

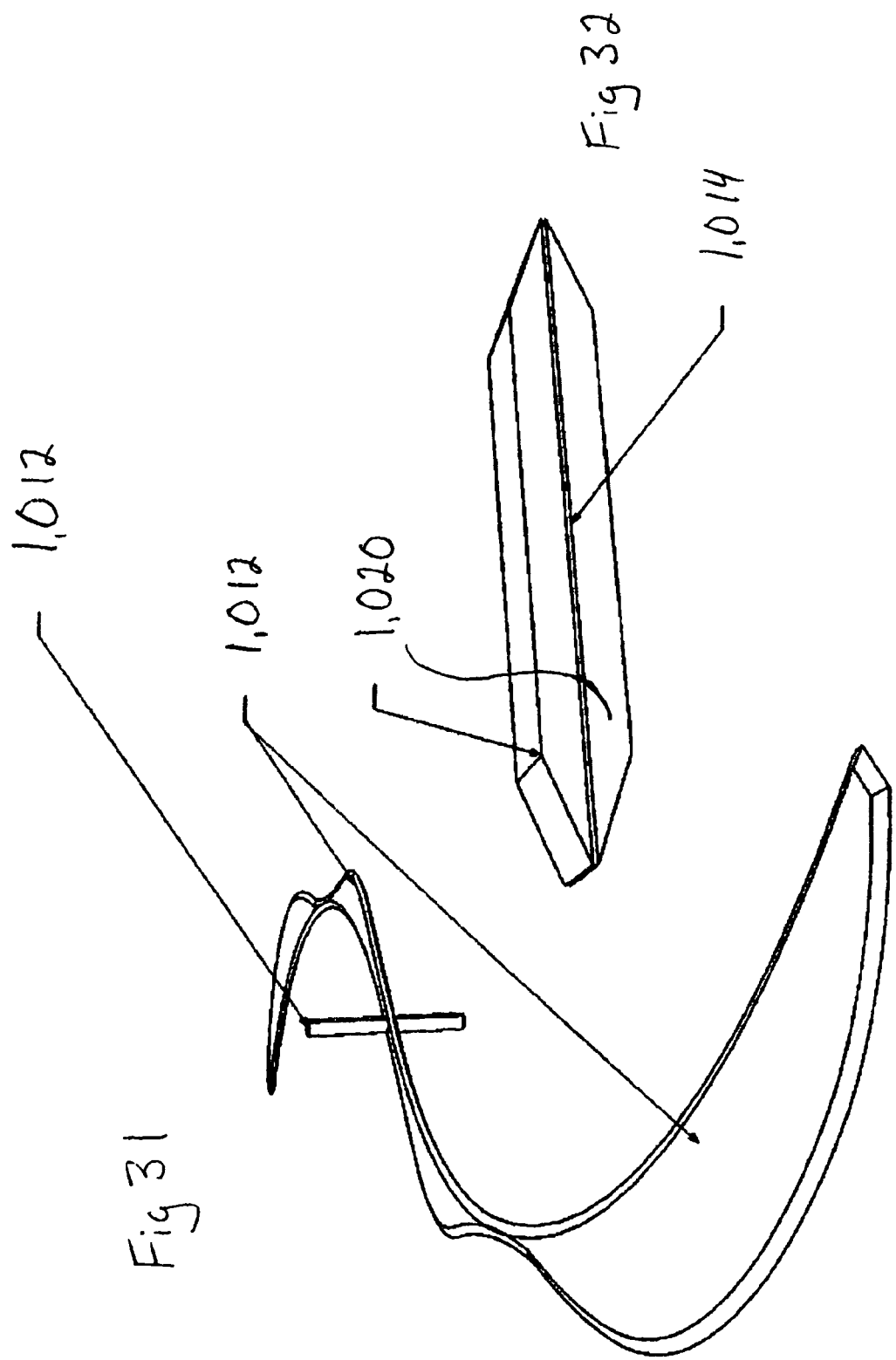

TRANSVERSE-AXIS TURBINE WITH TWISTED FOILS

TECHNICAL FIELD

The present invention relates to turbines for generating rotary motion from a flowing fluid, generally water or air, wherein, in use, the axis of rotation of the turbine is transverse to the direction of fluid flow.

BACKGROUND ART

Wind turbines configured for use with their axis of rotation transverse to the wind direction are well known. In the case of wind turbines having their axis of rotation transverse to the flow of air, the axis of rotation is most conveniently (in terms of secure mounting and ability to accommodate different wind directions) oriented generally vertically, and such wind turbines are typically referred to as vertical axis wind turbines (or VAWTs) to differentiate them from horizontal axis wind turbines in which in use the axis of rotation is generally parallel to the wind direction. The rotor of a horizontal axis wind turbine must face either into or away from the direction of the wind and a yaw mechanism is required to rotate the rotor about the vertical axis of the tower to keep the rotor in proper alignment with the wind flow.

Vertical axis wind turbines (VAWTs) generally comprise a central shaft arranged vertically with respect to the ground and rotatably supporting a plurality of blades or vanes arrayed around the shaft and roughly perpendicular to the wind flow. Vertical axis turbines do not require a yaw mechanism to align the blades with the wind and the generator or other energy converter and related power transmission equipment may be mounted on the ground at the base of the turbine, potentially substantially reducing the complexity and cost of the installation.

The best-known types of VAWTs are the Savonius type (as shown in, U.S. Pat. No. 1,766,765, WIND ROTOR, issued 24 Jun. 1930 to Savonius, which discloses a Savonius-type turbine having a self regulating means) and the Darrieus type (as shown in U.S. Pat. No. 1,835,018, TURBINE HAVING ITS ROTATING SHAFT TRANSVERSE TO THE FLOW OF THE CURRENT, issued 8 Dec. 1931 to Darrieus). As indicated by the following exemplary patent documents, several different configurations of VAWTs have been developed.

U.S. Pat. No. 1,100,332, WINDMILL, issued 16 Jun. 1914 to Smith, discloses a two-level vertical-axis wind turbine, in which the top level has essentially Darrieus-type foils.

U.S. Pat. No. 3,941,504, WIND POWERED ROTATING DEVICE, issued 2 Mar. 1976 to Snarbach, discloses a vertical-axis wind turbine having three generally helical foils wherein the bottoms of the foils are spaced apart and the foils are twisted and configures such that the leading edges of the foils all meet at the tops of the foils.

U.S. Pat. No. 4,293,274, VERTICAL AXIS WIND TURBINE FOR GENERATING USABLE ENERGY, issued 6 Oct. 1981 to Gilman, discloses a helical Savonius-type turbine having means for varying the vane surface available for wind contact.

U.S. Pat. No. 4,365,934, WIND MACHINE, issued 28 Dec. 1982 to Mason, discloses a vertical-axis wind turbine, having blades pivotally mounted to enable them to swing out to catch wind, and to swing in to feather to reduce drag, as required during each rotation of the turbine.

U.S. Pat. No. 5,405,246, VERTICAL-AXIS WIND TURBINE WITH A TWISTED BLADE CONFIGURATION, issued 11 Apr. 1995 to Goldberg, discloses a Darrieus-type turbine with helical foils.

U.S. Pat. No. 6,428,275, HELICAL WIND ROTOR AND METHOD FOR MANUFACTURING SAME, issued 6 Aug. 2002 to Jaakola, discloses a helical Savonius-type turbine with a foil design utilizing a planar material.

U.S. Pat. No. 7,040,859, WIND TURBINE, issued 9 May 2006 to Kane, discloses a vertical-axis wind turbine having multiple generally vertically extending blades arrayed about its periphery and having a rounded cap.

U.S. Pat. No. 7,132,760, WIND TURBINE DEVICE, issued 7 Nov. 2006 to Becker, discloses a hybrid vertical-axis wind turbine comprising a pair of inner helical non-overlapping blades and a pair of outer longitudinally extending airfoil-type blades.

Publication No. US 2007/0104582, published 10 May 2007 (now U.S. Pat. No. 7,393,177, issued 1 Jul. 2008 to Rahai et al.), discloses a foil profile for a Savonius-type turbine.

Although, general developments in wind turbine technology may have some application to water turbine technology, given the differences in fluid density and operational environments, there has not been significant overlap in recent wind and water turbine developments. Further, as what is generally understood to be the primary benefit of transverse-axis turbines, alignment indifference, is less significant in water turbines, for which the predictability of the flow direction (in the case of rivers) or directions (in the case of tidal streams) simplifies alignment issues, there has been relatively little development of transverse-axis water turbines as compared to VAWTs. Water turbines are typically analogous to horizontal axis wind turbines in that they are configured such that in use the axis of rotation is preferably aligned with the flow direction of the water.

DISCLOSURE OF INVENTION

Transverse-axis turbines of the present invention fall generally into the class of the so-called Savonius-type transverse-axis turbines. The invention encompasses both solid-foil configurations (wherein the single foil is in very general terms analogous to the "S"-shaped rotor of the original Savonius-type turbine) or two-foil configurations (wherein the two foils are in very general terms analogous to the two foils of the Savonius-type turbine disclosed in U.S. Pat. No. 1,766,765). Two-foil Savonius-type turbines can in part be described by the overlap between the foils (typically expressed as a percentage of the chord length of each foil) and by the smallest dimension of the gap between the foils (also typically expressed as a percentage of the chord length of each foil). Following this approach to describing two-foil Savonius-type turbines, solid-foil Savonius-type turbines can be conceptualized as being two-foil turbines having 0% overlap and 0% gap.

In this specification and the claims, the following terms have the following meanings:
a) foil or blade: the portion of the turbine that usefully interacts with the wind (or other flowing fluid) in the extraction of power from the wind;
b) two-foil turbine (or configuration): a turbine having two foils, with a gap between the foils and wherein each foil is a mirror image of the other;
c) solid-foil turbine (or configuration): a turbine with foils having 0% overlap and 0% gap, wherein the axis of rotation is within the component comprising the foils and the portion of the component on one side of the axis of rotation is a mirror image of the portion of the component on the other side of the axis of rotation;

d) span: the distance, measured essentially parallel to the axis of rotation, from one end of a foil to the other end of the foil;

e) outer edge: the edge of a foil furthest from the axis of rotation;

f) inner edge: the edge of a foil of a two-foil turbine that is closest to the axis of rotation (a foil of a solid-foil configuration does not have inner edge);

g) chord length:
   i) in the case of a two-foil turbine, the distance from the outer edge to the inner edge, measured perpendicular to the axis of rotation; and
   ii) in the case of a solid-foil turbine, the distance from the outer edge to the axis of rotation, measured perpendicular to the axis of rotation;

h) foil section: the shape of a foil from the outer edge to the inner edge (in the case of two-foil turbines) or to the axis of rotation (in the case of solid foil turbines), when viewed as a section normal to the axis of rotation;

i) twist: the change of the angle of incidence of the airfoil sections along the span; and j) tip speed ratio (TSR): the ratio of the rotational speed of the outer edge of a foil and the flow velocity of the fluid causing the foil rotation.

In this specification and in the claims, terms indicating a wind-turbine or water-turbine embodiment should not be taken as restricting the invention described herein to only wind or water turbines; the invention is applicable to use with any flowing fluid. Similarly, terms indicating positions and orientations, such as top, bottom, upper, lower, right, left, vertical, horizontal etc. are used herein for ease of understanding and do not indicate that the components thus described always have the same positions or orientations.

In one aspect, the present invention is a transverse-axis turbine, typically having a mount at only one end (in the case of a VAWT, at the bottom end of the turbine), wherein the profile of the turbine is generally tapered, in that in the vicinity of the end of the turbine opposite the mount end (referred to herein as the non-mount end) the chord length diminishes, such that at the top end the chord length is zero, near zero or at least is substantially less than the chord length at the mount end.

The taper may be linear, such that in use the three-dimensional area swept by the turbine is essentially a section of a cone. Alternatively, the taper may be curved such that the three-dimensional area swept by the turbine is essentially elliptical or spherical. Further, a portion of the turbine (preferably a portion closer to the mount end than the non-mount end) may not be tapered (i.e. the three-dimensional area swept by the bottom portion may be cylindrical). Such a non-tapered portion may be combined with a linear-taper portion or a curved-taper portion.

Further, the maximum chord length may not be at the mount end but rather may be located at a position along the span between the mount end and non-mount end, wherein, moving along the span from the mount end towards the non-mount end, the chord length increases up to the location of maximum chord length and then decreases towards the non-mount end. Such turbine configurations are generally referred to herein as double-tapered. Such double-tapered configurations may optimally be used in turbulent locations, such as may pertain close to the ground, in the case of wind turbines.

For a wind application, the location of the maximum chord length in a double-tapered configurations may be in the vicinity of roughly 30% to 50% of the span (measured from the mount end). The chord length at the mount end is roughly 85% of the maximum chord length. The height to width ratio of the turbine may be in the vicinity of 1.67:1 and generally not less than 1.5:1.

The turbine may have a helical configuration, in that each foil may have a twist of at least 180°. With tapered configurations, it is preferable for the twist to be at least roughly 200° to 220°. Alternatively, the twist may be substantially greater than 200°, in which case the degrees of twist is preferably roughly 20° to 30° plus a multiple of 180°.

The turbine may have a quasi-conical base at the mount end, the quasi-conical base having either a simple conical shape or more preferably in terms of fluid flow, a complex concave shape. A quasi-conical base is strong; reduces drag by reducing the overall surface over which the relevant fluid flows (referred to at times as "wetted surface"); and provides space for bearings and other equipment (such as all or a portion of a generator).

A helical configuration facilitates self starting and smooths the torque output of each complete revolution. The helical form, the foil section configurations described herein; the tapered configuration and the quasi-conical base, are all understood to contribute to the formation and persistence of a low-pressure lift area that migrates from the mount end toward the non-mount end on the surface of the foil as the turbine rotates. As the lift area migrates upwards, it assists in the establishment of laminar flow in its vicinity. This enhancement of laminar flow results in a broadening of the range of angles of attack for which laminar flow pertains over each section of a foil, thus producing greater lift. The sections above the section at which the lift area is established have greater rotational motive force than they would have without the migration of the lift area, resulting in a reasonably constant torque throughout each full rotation of a thus tapered foil.

In one aspect the present invention is a turbine, for rotating responsive to a fluid flowing relative to the turbine wherein in use the turbine is oriented with its axis of rotation transverse to the fluid flow, the turbine comprising at least two foils extending along the axis of rotation, wherein: each foil has a mount end at one end of its span and a non-mount end at the other end of its span; each foil has a twist about the axis of rotation of no less than about 180° along its span; one side of the foil section of each foil is generally concave and the other side of the foil section of the foil has an outer convex section, an intermediate concave section and an inner convex section; and the length of the chord of the foil in the vicinity of the mount end is greater than the length of the chord of the foil in the vicinity of the non-mount end, whereby the profile of the turbine is generally tapered.

BRIEF DESCRIPTION OF DRAWINGS

FIG. 13 is a top-view schematic representation showing selected chord/radius lines of a helical, single-taper, VAWT embodiment of the present invention.

FIG. 14 is a top-view schematic representation showing selected chord/radius lines of a helical, double-taper, VAWT embodiment of the present invention.

FIG. 15 is a partial perspective view showing a solid-foil VAWT (only part of the foil is illustrated), having a quasi-conical base.

FIG. 16 is a partial perspective view of the solid-foil VAWT shown in FIG. 15, shown at a different relative angle of rotation from the view in FIG. 15.

FIG. 29 is a perspective isolated view of one section of the ram-air VAWT shown in FIG. 28.

FIG. 30 is a perspective isolated cutaway view of the section of the ram-air VAWT shown in FIG. 29, showing a portion of the interior of the section.

FIG. 31 is a perspective view of a batten of the ram-air VAWT shown in FIGS. 28, 29 and 30, shown with a section of associated shaft.

FIG. 32 is a sectional view of the batten shown in FIG. 31.

a) FIG. 33 is a foil-section view in the vicinity of the mount-end;
b) FIG. 34 is a foil-section view of a section at 30° of twist from the foil-section of FIG. 33;
c) FIG. 35 is a foil-section view of a section at 30° of twist from the foil-section of FIG. 34;
d) FIG. 36 is a foil-section view of a section at 30° of twist from the foil-section of FIG. 35;
e) FIG. 37 is a foil-section view of a section at 30° of twist from the foil-section of FIG. 36;
f) FIG. 38 is a foil-section view of a section at 30° of twist from the foil-section of FIG. 37;
g) FIG. 39 is a foil-section view of a section at 30° of twist from the foil-section of FIG. 38; and
h) FIG. 40 is a foil-section view of a section at 30° of twist from the foil-section of FIG. 39 and in the vicinity of the non-mount end. For detail clarity, FIG. 40 is not of the same scale as FIGS. 33 to 39.

MODES FOR CARRYING OUT THE INVENTION

The embodiments described herein comprise complex shapes and curves. To enhance understanding of these shapes several of the drawings contain extra lines intended to indicate the contour of the associated shape. Such lines should not be understood as indicating particular features, such as edges or joints.

Figure 1:
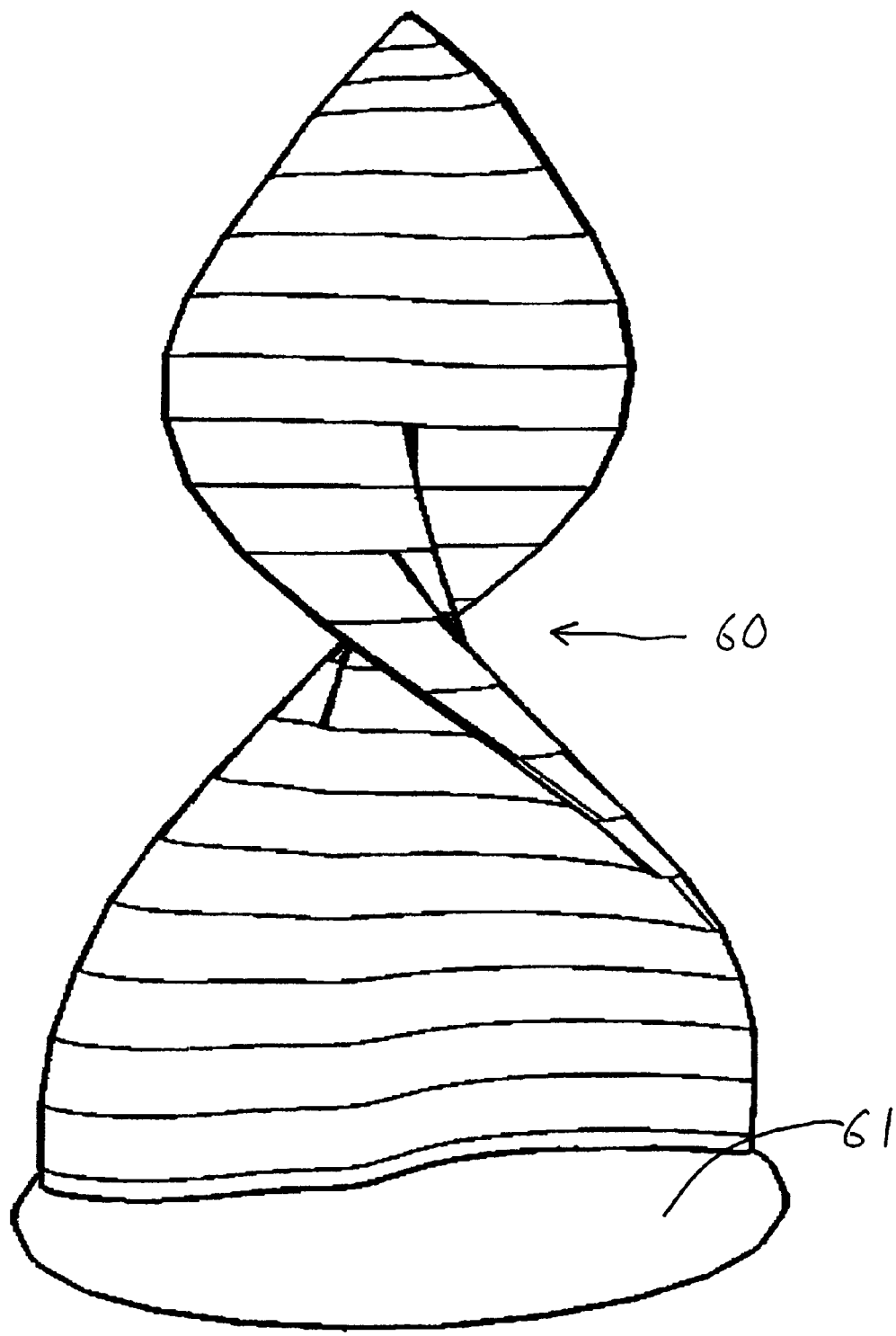
FIG. 1 is a perspective view showing an exemplary solid-foil, helical, single-taper, VAWT embodiment of the present invention.
Figure 2:
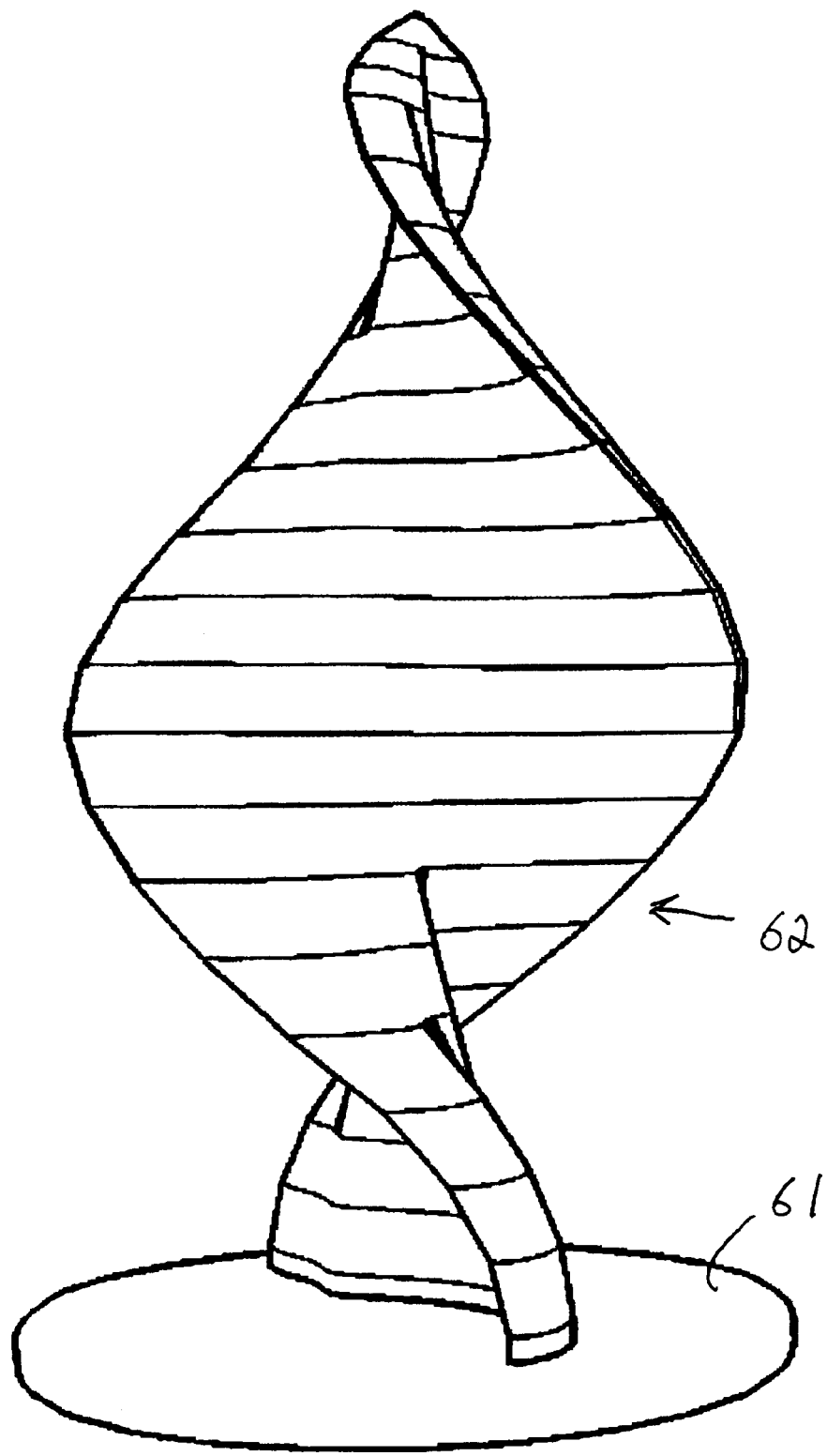
FIG. 2 is a perspective view showing an exemplary solid-foil, helical, double-taper, VAWT embodiment of the present invention.
Figure 3:
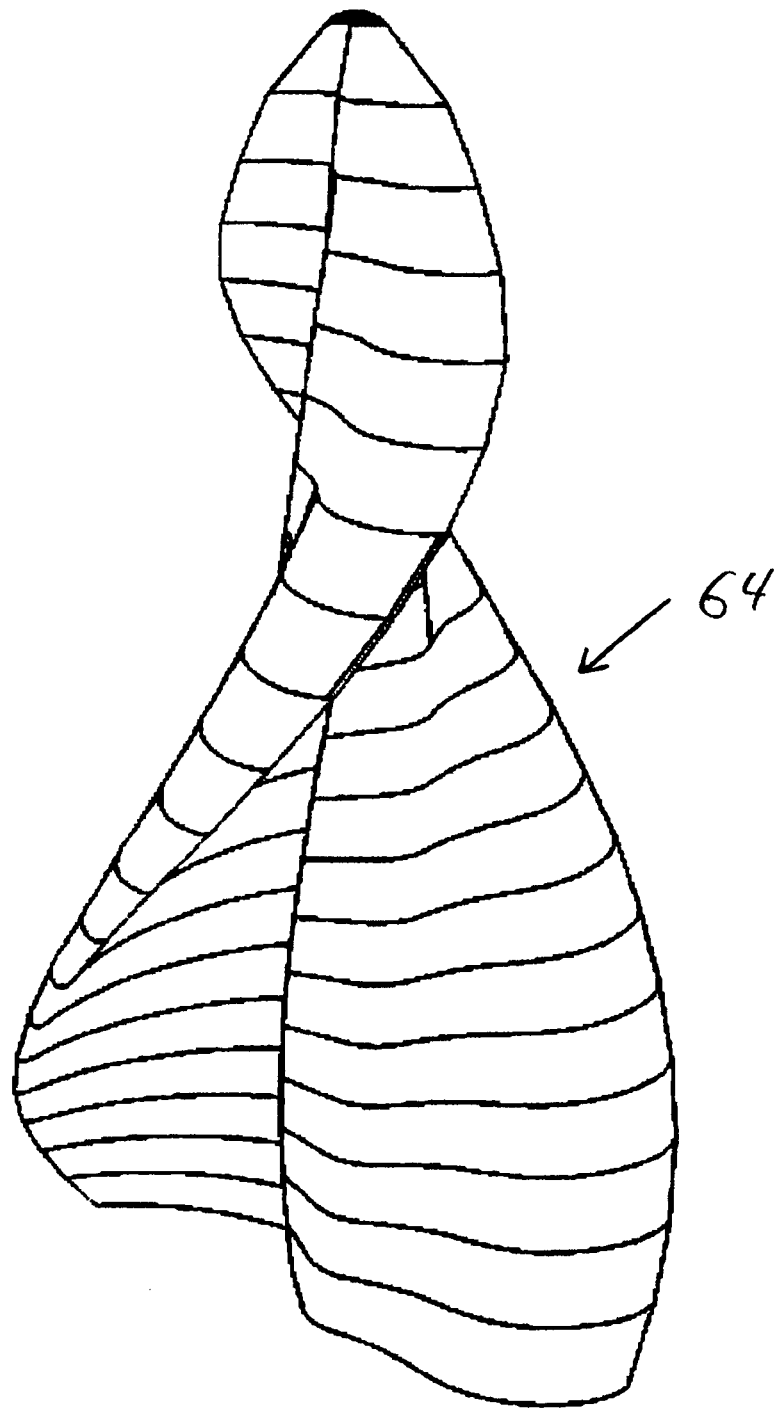
FIG. 3 is a perspective view showing an exemplary two-foil, helical, single-taper, VAWT embodiment of the present invention.
Figure 4:
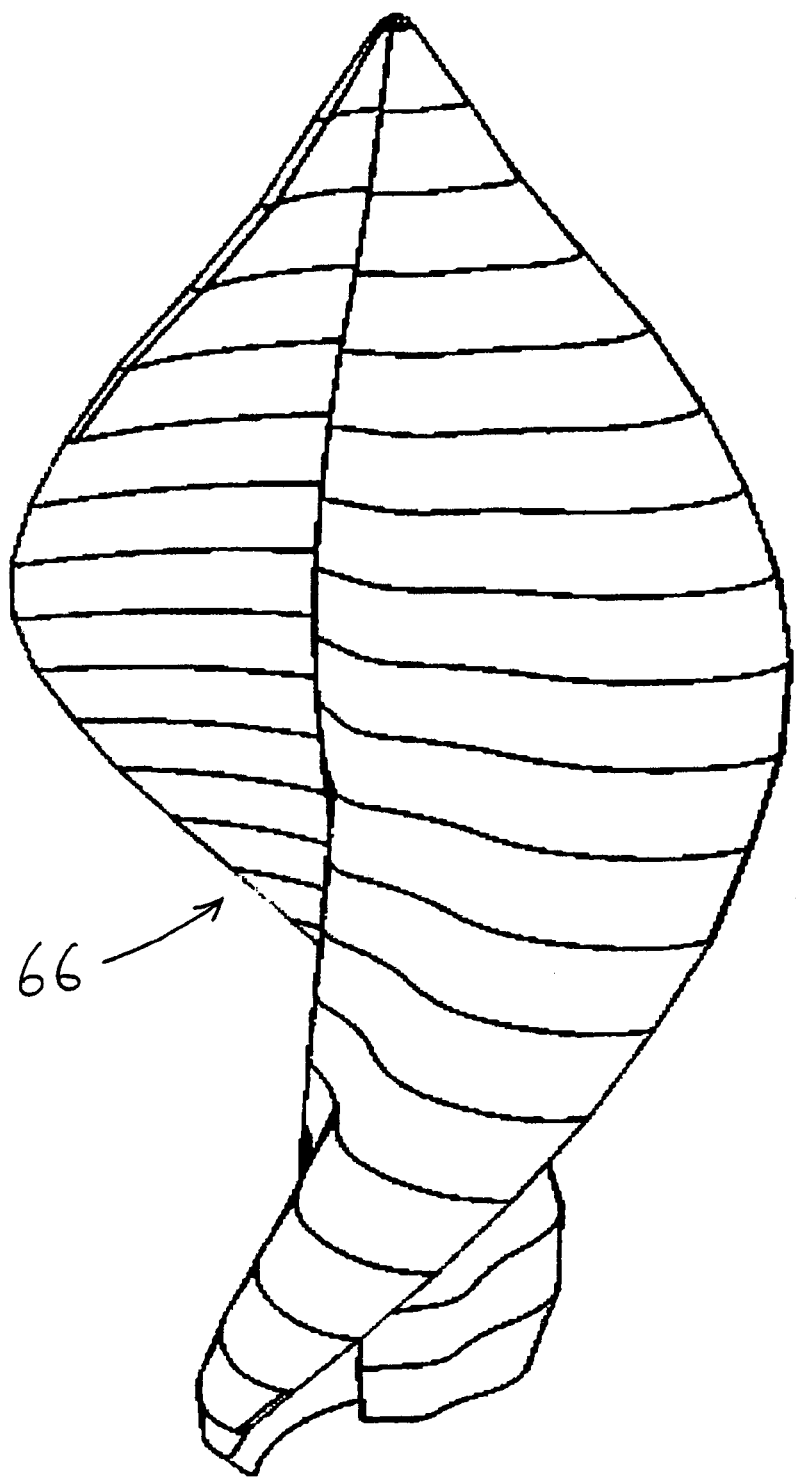
FIG. 4 is a perspective view showing an exemplary two-foil, helical, double-taper, VAWT embodiment of the present invention.
Figure 5:
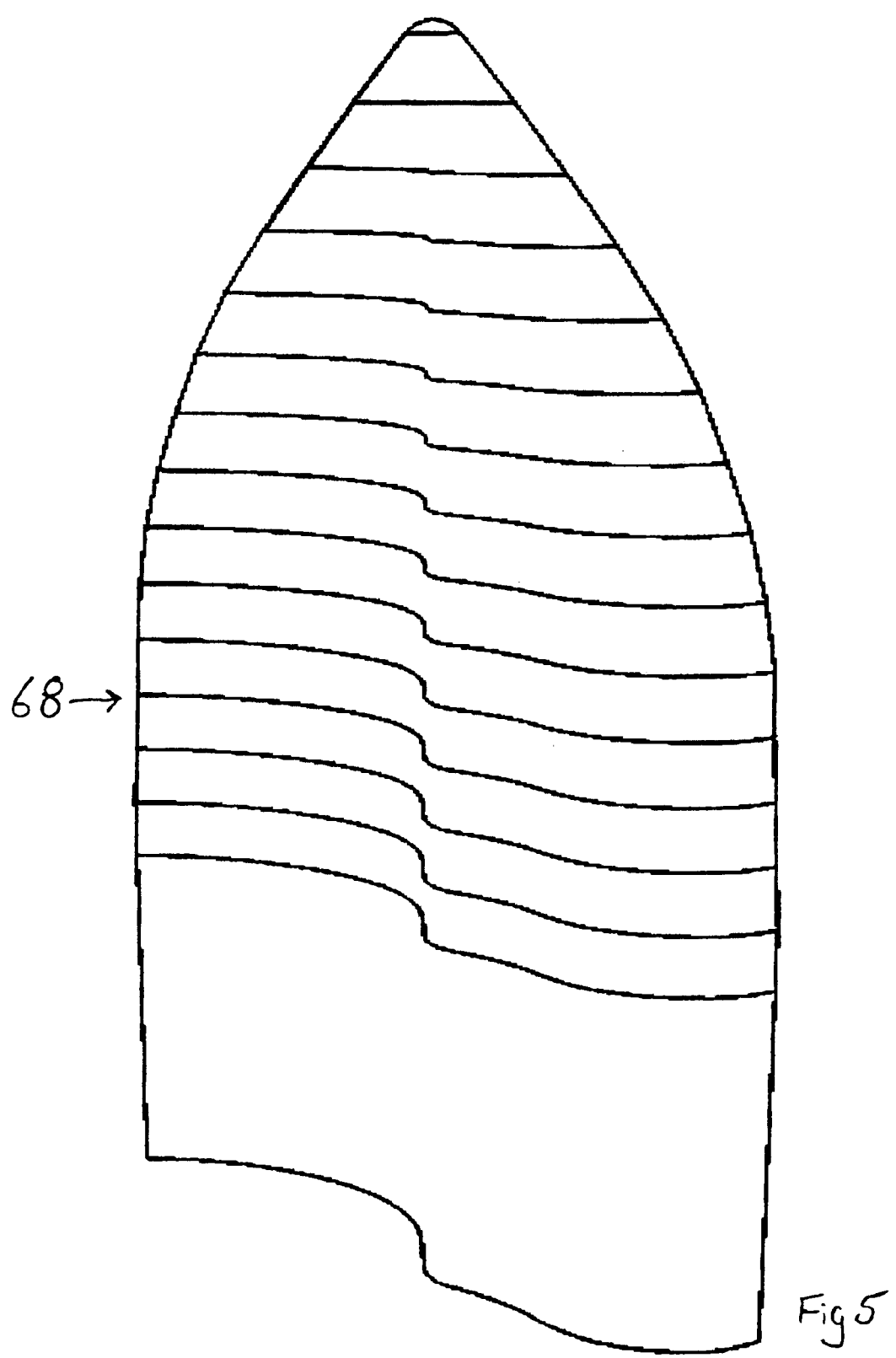
FIG. 5 is a perspective view showing an exemplary solid-foil, non-helical, single-taper, VAWT embodiment of the present invention.
Figure 6:
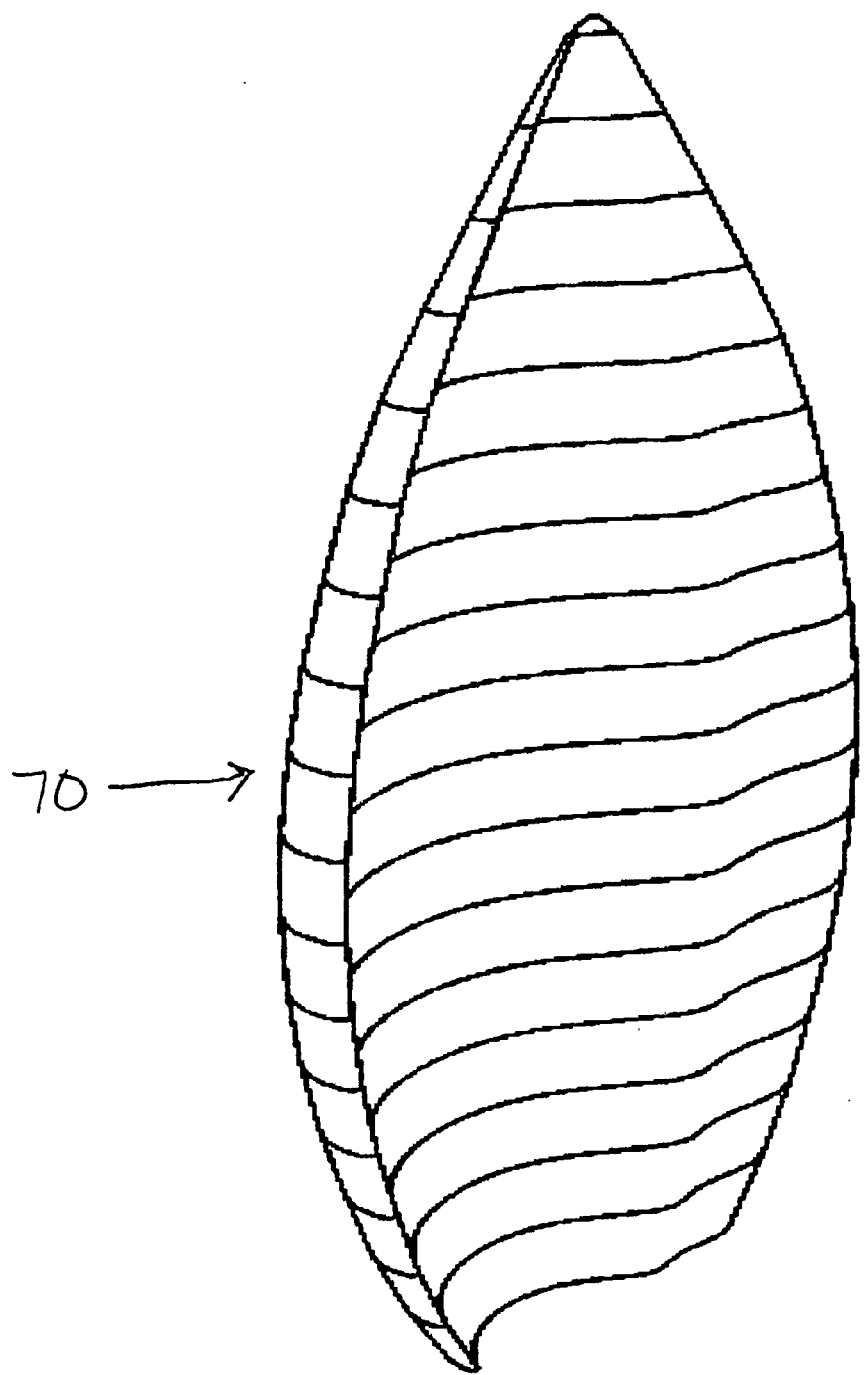
FIG. 6 is a perspective view showing an exemplary solid-foil, non-helical, double-taper, VAWT embodiment of the present invention.
Figure 7:
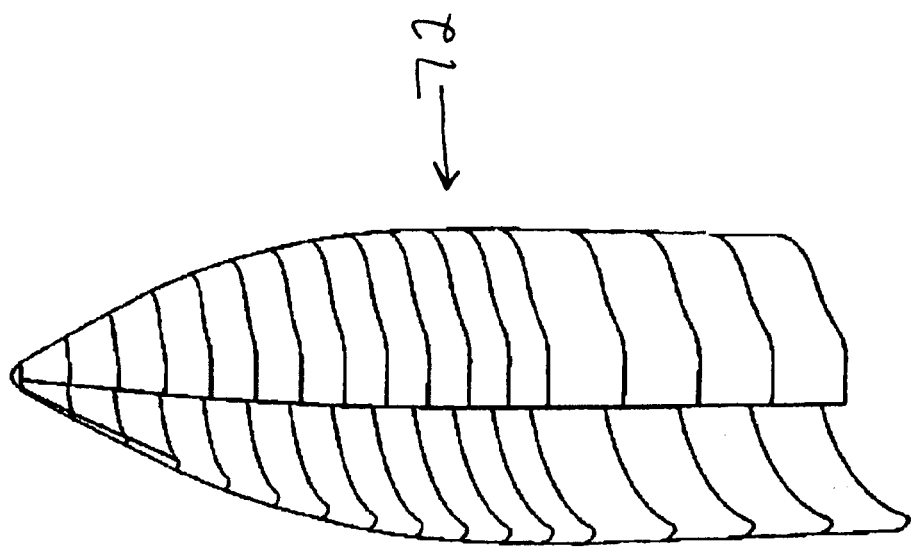
FIG. 7 is a perspective view showing an exemplary two-foil, non-helical, single-taper, VAWT embodiment of the present invention.
Figure 8:
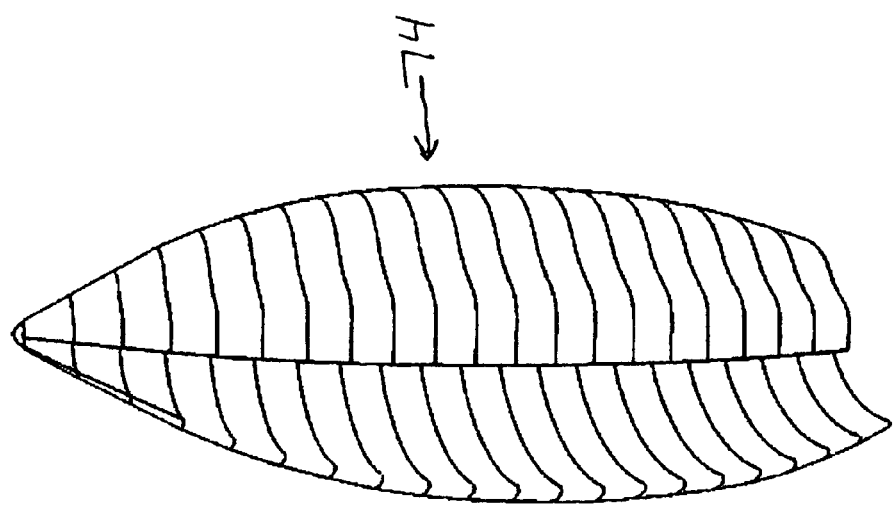
FIG. 8 is a perspective view showing an exemplary two-foil, non-helical, double-taper, VAWT embodiment of the present invention.

FIG. 1 shows a solid-foil, helical, single-taper VAWT 60 having a planar base 61. FIG. 2 shows a solid-foil, helical, double-taper VAWT 62 having a planar base 61. FIG. 3 shows the foils (i.e. no base or mounting means are shown) of a two-foil, helical, single-taper VAWT 64. FIG. 4 shows the foils (i.e. no base or mounting means are shown) of a two-foil, helical, double-taper, VAWT 66. FIG. 5 shows the foil (i.e. no base or mounting means are shown) of a solid-foil, non-helical, single-taper, VAWT 68. FIG. 6 shows the foil (i.e. no base or mounting means are shown) of a solid-foil, non-helical, double-taper VAWT 70. FIG. 7 shows the foils (i.e. no base or mounting means are shown) of a two-foil, non-helical, single-taper VAWT 72. FIG. 8 shows the foils (i.e. no base or mounting means are shown) of a two-foil, non-helical, double-taper VAWT 74.

FIGS. 9, 10, 11 and 12 are foil-section views of different VAWT embodiments of the present invention. Each of these drawings includes a chord/radius line with associated perpendicular lines indicating the locations of a collection of offset dimensions. Generally, two offset dimensions are associated with each of the perpendicular lines: one from the chord/radius line to the nearest foil surface (indicated by lower-case-letter reference characters) and a second from the nearest foil surface to the other foil surface (indicated by upper-case-letter reference characters). An upper-case-letter reference character in each drawing (for example, "Q" in FIG. 9) is associated with the radius of the foil section in the immediate vicinity of the outer edge. The axis (center) of rotation of the relevant turbine is indicated on each drawing.

Associated with each of FIGS. 9, 10, 11 and 12 in this description is a table setting out the dimensions indicated in the drawing in terms of percentages of the length of the chord/radius shown in the drawing. The embodiments of the present invention include tapered configurations in which the length of the chord/radius differs at different vertical locations on the turbine, but the relative shape of the foil sections remains essentially constant at different vertical locations on the turbine. Thus, the general shape of such a turbine can be determined from a foil section with dimensions specified in terms of percentages of the chord/radius length and the dimensions (or dimension in the case of non-tapered configurations) of the chord/radiuses at selected vertical locations. If the turbine is helical, the twist can be specified by showing (by way of drawings or tables) the relative angles between the chord/radiuses at selected vertical locations (discussed further below).

Figure 9:
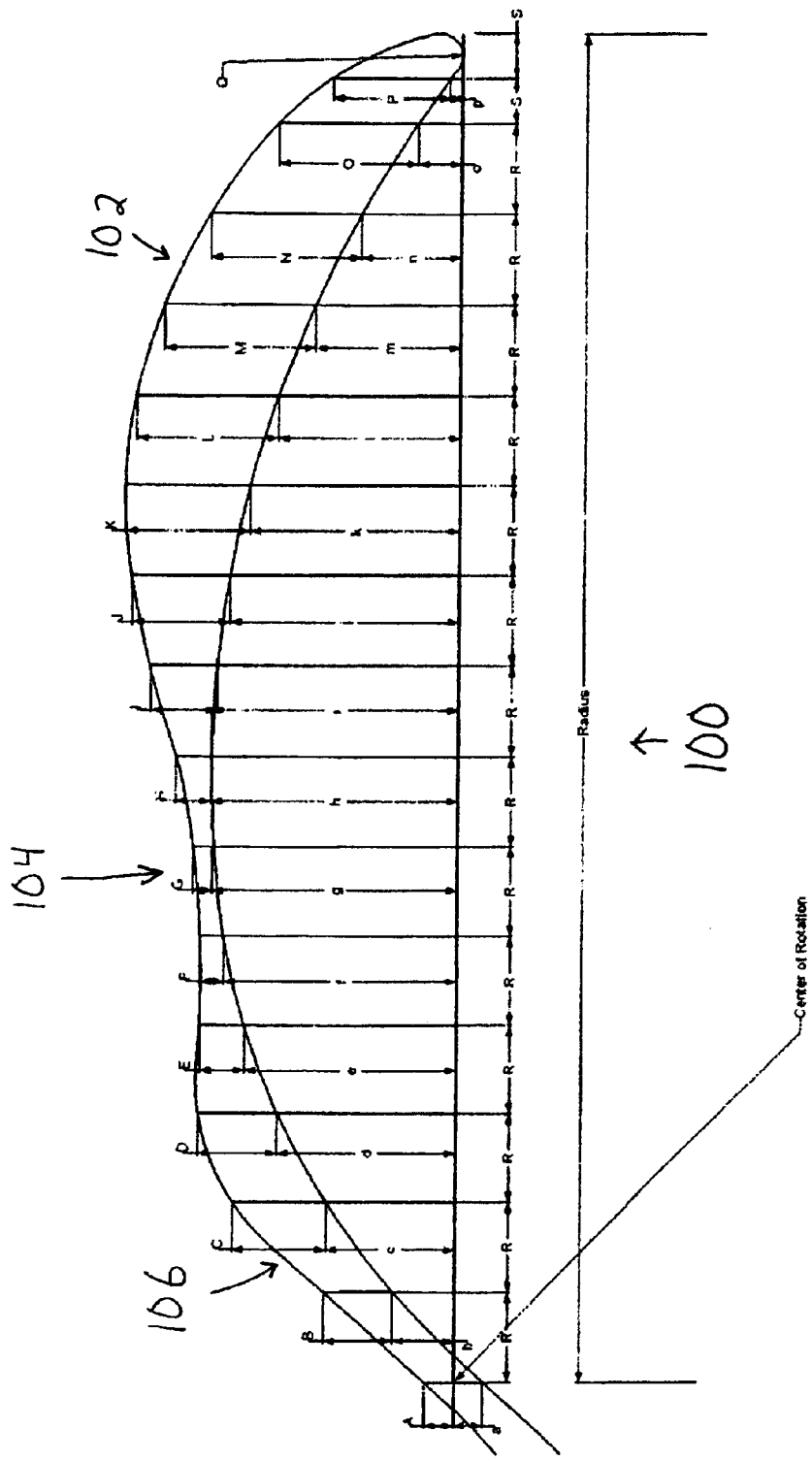
FIG. 9 is a foil-section view of a solid-foil VAWT embodiment of the present invention, having a double-curve foil section, the drawing indicating offset dimensions for the foil section, the offsets taken from a chord/radius line.

FIG. 9 shows a solid-foil double-curve VAWT foil-section 100 of an embodiment of the present invention. The foil section is double curved in that the surface of the foil furthest from the chord/radius line comprises an outer convex section 102 an intermediate concave section 104 and an inner convex section 106. The dimensions indicated in FIG. 9, as percentages of the chord/radius length (indicated as "Radius" in FIG. 9) are as follows:

| | |
|---|---|
| a | 2.2 |
| A | 2.2 |
| b | 4.6 |
| B | 5.0 |
| c | 9.6 |
| C | 6.8 |
| d | 13.0 |
| D | 5.8 |
| e | 15.6 |
| E | 3.2 |
| f | 17.0 |
| F | 1.8 |
| g | 18.0 |
| G | 1.4 |
| h | 18.0 |
| H | 2.6 |
| i | 18.0 |
| I | 4.8 |
| j | 16.8 |
| J | 7.0 |
| k | 15.4 |
| K | 9.0 |
| l | 13.4 |
| L | 10.2 |
| m | 10.6 |
| M | 10.8 |
| n | 7.4 |
| N | 11.0 |
| o | 3.2 |
| O | 10.2 |
| p | .8 |
| P | 8.6 |
| Q | 1.6 (radius of outer edge) |
| R | 6.6 (spacing of indicated offsets) |
| S | 3.4 (spacing of indicated offsets) |

Figure 10:
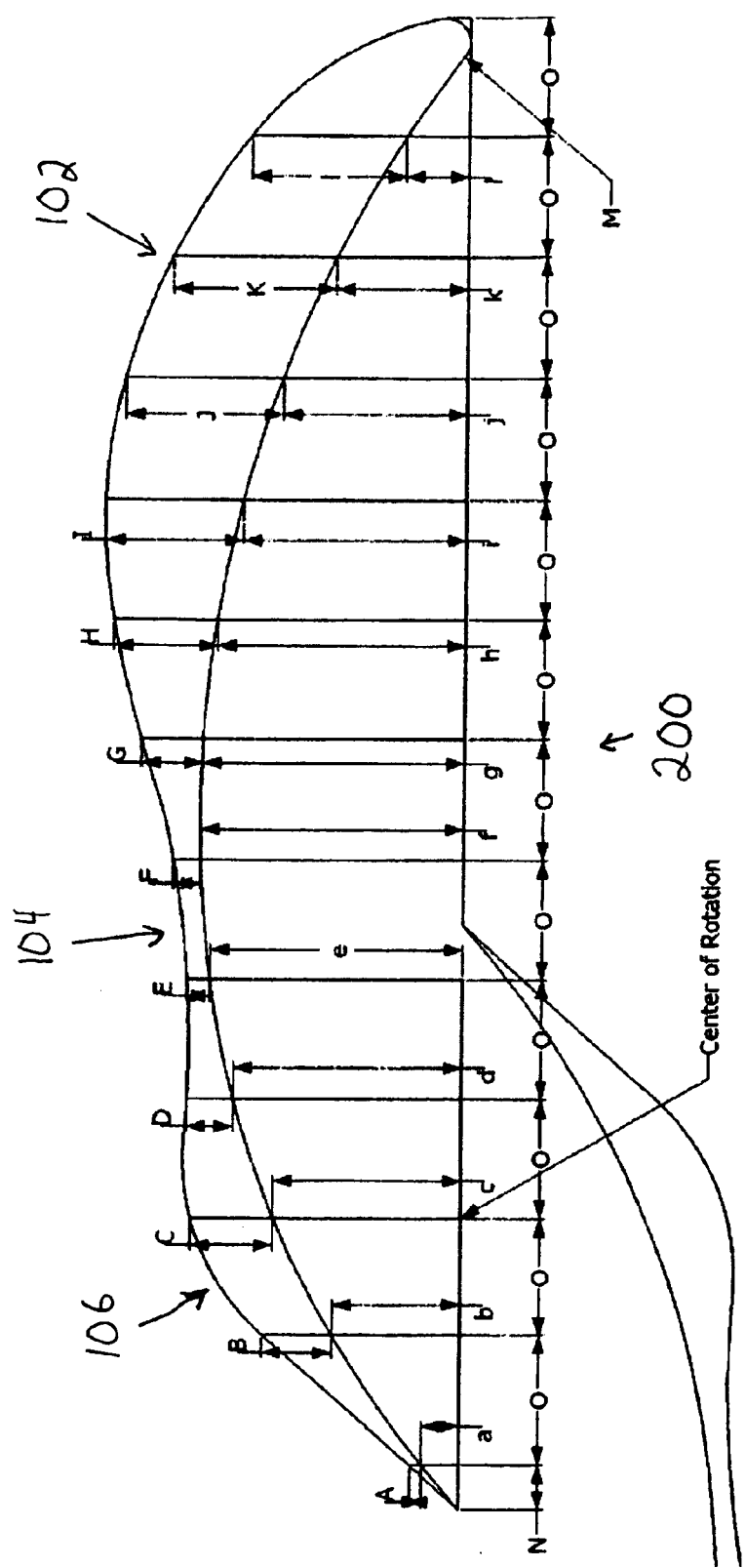
FIG. 10 is a foil-section view of a two-foil VAWT embodiment of the present invention, having a double-curve foil section, the drawing indicating offset dimensions for the foil section, the offsets taken from a chord/radius line.

FIG. 10 shows a two-foil double-curve VAWT foil-section 200 (and a portion of the foil section of the other foil) of an embodiment of the present invention. The foil section is double curved in that the surface of the foil furthest from the chord/radius line comprises an outer convex section 102 an intermediate concave section 104 and an inner convex section 106. The dimensions indicated in FIG. 10, as percentages of the chord/radius length (i.e. from the outer edge to the center of rotation) are as follows:

| | |
|---|---|
| a | 3.1 |
| A | 1 |
| b | 10.6 |
| B | 5.8 |
| c | 15.6 |
| C | 6.8 |
| d | 18.9 |
| D | 3.8 |
| e | 20.9 |
| E | 1.9 |
| f | 21.8 |
| F | 2.2 |
| g | 21.6 |
| G | 5 |
| h | 20.5 |
| H | 8.4 |
| i | 18.4 |

Figure 11:
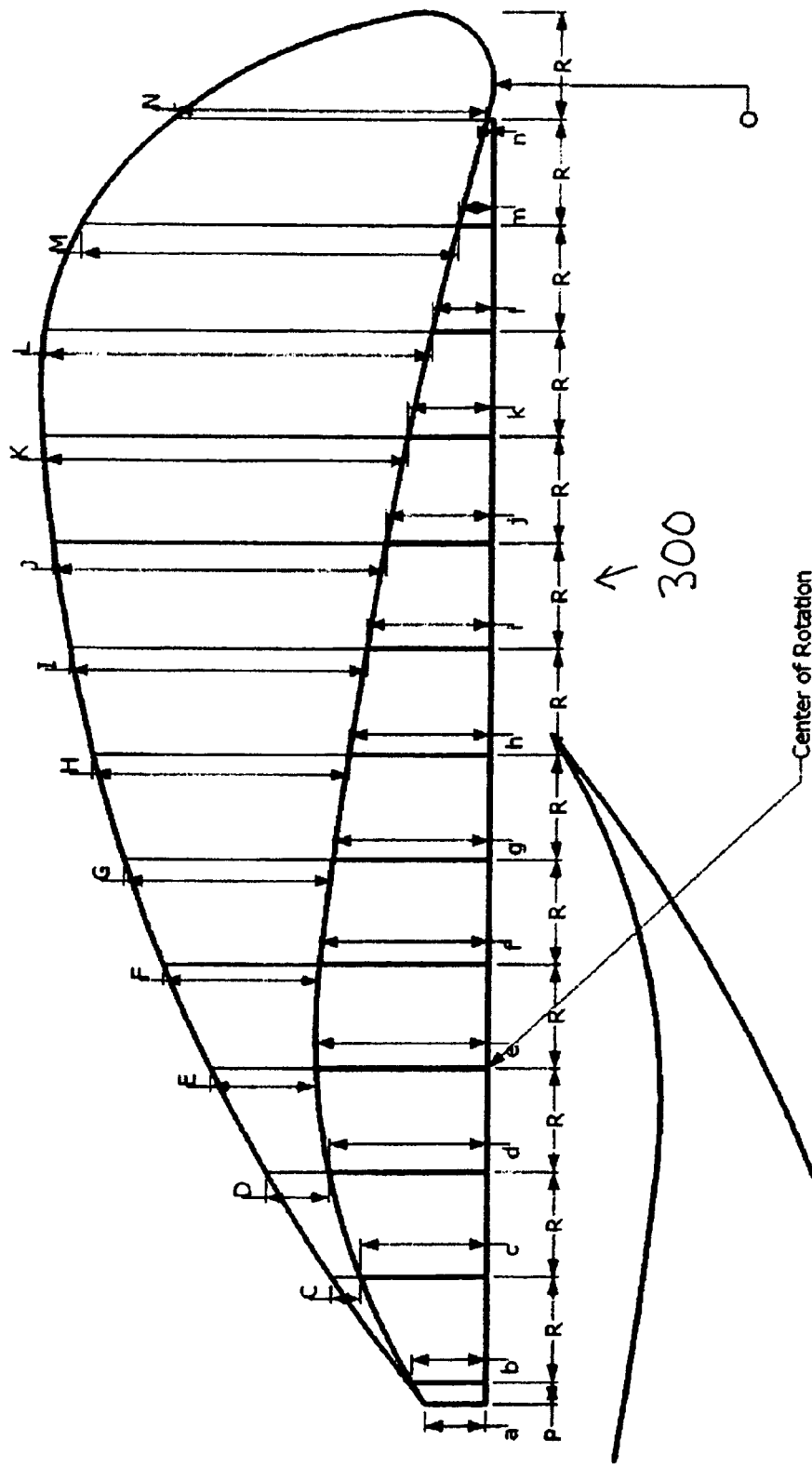
FIG. 11 is a foil-section view of a two-foil VAWT embodiment of the present invention, having a single-curve foil section, the drawing indicating offset dimensions for the foil section, the offsets taken from a chord/radius line.

FIG. 11 shows a two-foil single-curve VAWT foil-section 300 (and a portion of the foil section of the other foil) of an embodiment of the present invention. The foil section is referred to as single curved to differentiate it from the double-curved foil sections described above. Unlike the double-curved foil sections, in the two-foil single-curve VAWT foil-section 300, the surface of the foil furthest from the chord/radius line does not have a concave section. The dimensions indicated in FIG. 11, as percentages of the chord/radius length (i.e. from the outer edge to the center of rotation) are as follows:

| | |
|---|---|
| a | 5.9 |
| B | 7.1 |
| c | 12.1 |
| C | 2.7 |
| d | 15.1 |
| D | 6 |
| e | 16.3 |
| E | 9.9 |
| f | 16.1 |
| F | 14.6 |
| g | 15 |
| G | 19.4 |
| h | 13.6 |
| H | 23.8 |
| i | 12 |
| I | 27.6 |
| j | 10.1 |
| J | 30.9 |
| k | 8.1 |
| K | 33.9 |
| l | 5.9 |
| L | 36 |
| m | 3.4 |
| M | 35.2 |
| n | .7 |
| N | 29.6 |
| O | 6.8 (radius of outer edge) |
| P | 2.1 (spacing of indicated offset) |
| R | 10 (spacing of indicated offsets) |

Figure 12:
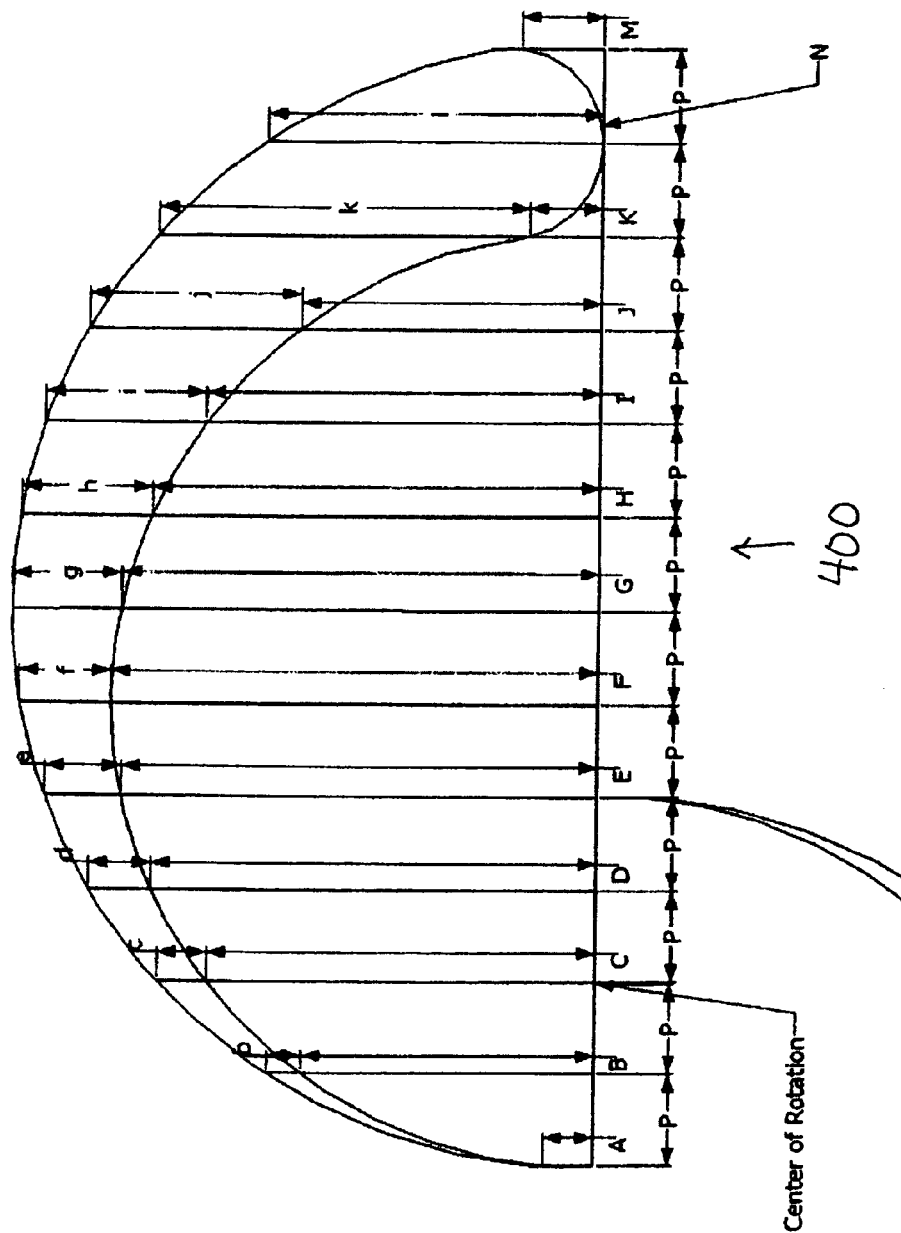
FIG. 12 is a foil-section view of a two-foil VAWT embodiment of the present invention, having a single-curve, improved-Savonius-type, foil section, the drawing indicating offset dimensions for the foil section, the offsets taken from a chord/radius line.
Figure 17:
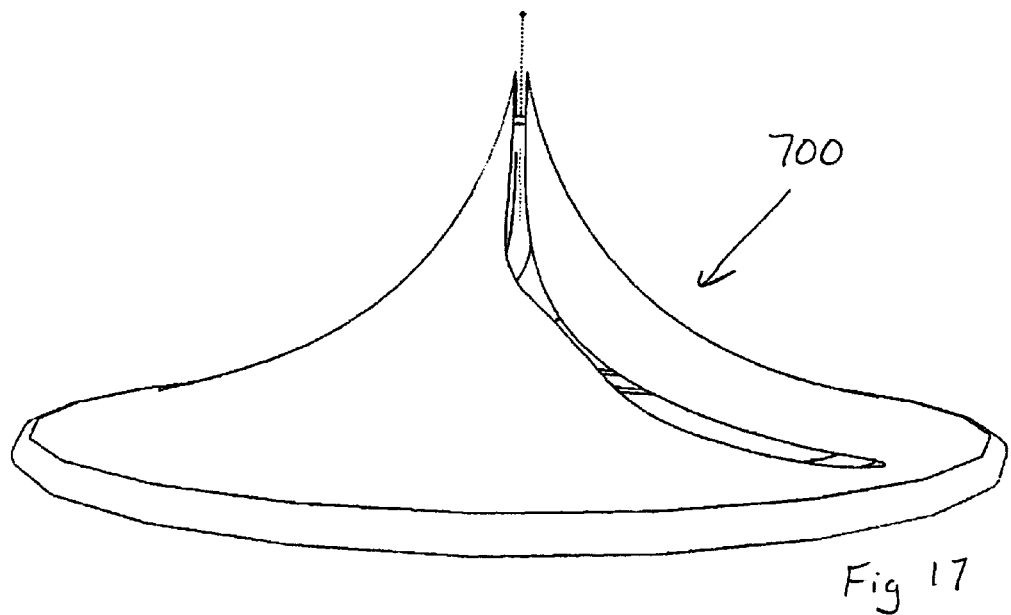
FIG. 17 is a perspective view of the quasi-conical base of a solid-foil VAWT, with the foil removed.

FIG. 12 shows a two-foil single-curve, improved-Savonius-type foil-section 400 (and a portion of the foil section of the other foil) of an embodiment of the present invention. The dimensions indicated in FIG. 12, as percentages of the chord/radius length (i.e. from the outer edge to the center of rotation) are as follows:

| | |
|---|---|
| A | 5.5 |
| B | 31.5 |
| b | 3.6 |
| C | 41.5 |
| c | 5.1 |
| D | 47.3 |
| d | 6.5 |
| E | 50.5 |
| e | 7.9 |
| F | 51.6 |
| f | 9.6 |
| G | 50.6 |
| g | 11.4 |
| H | 47.6 |
| h | 13.6 |
| I | 42.1 |
| i | 16.7 |
| J | 32.2 |
| j | 22 |
| K | 8 |
| k | 39.2 |
| L | 0 |
| l | 35.9 |
| M | 9 |
| N | 10.2 (radius of outer edge) |
| P | 10 (spacing of offsets) |

FIGS. 13 and 14 are top-view schematic representations showing selected chord/radius lines of tapered helical VAWT embodiments of the present invention. The chord/radius lines in FIGS. 13 and 14 radiate from the axis of rotation (referred to as center of rotation in FIGS. 9 through 12) of the relevant turbine. The displacement along the span between each adjacent pair of chord/radius lines is the same for all such pairs. Thus the angle between adjacent chord/radius lines indicates the twist between adjacent chord/radius lines and, cumulatively, the twist for the illustrated foil. As indicated in FIGS. 13 and 14, the twist for the foils illustrated therein is roughly 200°.

For clarity, FIGS. 13 and 14 show the chord/radius lines on only one side of the turbine; it will be clear that the chord/radius lines for the other side of the turbine of the foils would merely be mirror images of the chord/radius lines shown in the drawings.

The chord/radius lines in FIGS. 13 and 14 correspond generally to the chord/radius lines indicated in FIGS. 9 through 12. Any of the foil sections illustrated in FIGS. 9 through 12 could be used in the tapered helical configurations indicated by FIGS. 13 and 14.

In the general turbine configurations illustrated in FIGS. 13 and 14: the chord/radius line identified as "A" in each Figure is located at the bottom/base of the turbine; adjacent chord/radius lines are spaced one from the other along the span by an amount equal to 40% of the maximum chord/radius length (thus the distance along the span from chord/radius line "A" to chord/radius line "K" is 400% of the maximum chord/radius length in each Figure); and the angle between adjacent chord/radius lines is 20°.

FIG. 13 shows selected chord/radius lines of a helical, single-taper, VAWT 500 embodiment of the present invention. The dimensions of the chord/radius lines indicated in FIG. 13, as percentages of the maximum chord/radius length, are as follows:

| | |
|---|---|
| A | 100 |
| B | 100 |
| C | 100 |
| D | 100 |
| E | 99 |
| F | 97 |
| G | 93.2 |
| H | 82.3 |
| I | 65.2 |
| J | 38.5 |
| K | 8 |

FIG. 14 shows selected chord/radius lines of a helical, double-taper, VAWT 600 embodiment of the present invention. The dimensions of the chord/radius lines indicated in FIG. 14, as percentages of the maximum chord/radius length, are as follows:

| | |
|---|---|
| A | 20 |
| B | 40 |
| C | 100 |
| D | 100 |
| E | 99 |
| F | 97 |
| G | 93.2 |
| H | 82.3 |
| I | 65.2 |
| J | 38.5 |
| K | 8 |

The tapers illustrated in FIGS. 13 and 14, and other similar tapers, may also be used with non-helical configurations. In top-view schematic representations analogous to FIGS. 13 and 14 of such non-helical configurations, the chord/radius lines would merely overlie one another.

Figure 18:
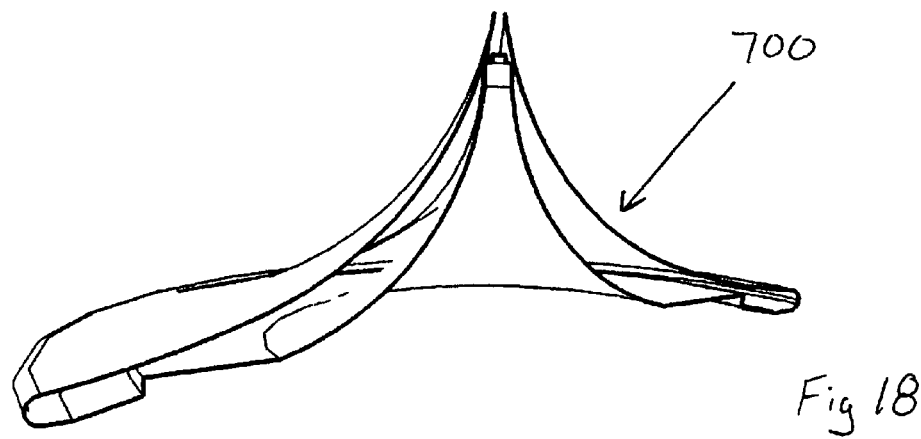
FIG. 18 is a cut-away perspective view of the quasi-conical base shown in FIG. 17.

FIGS. 15, 16, 17 and 18 show a quasi-conical base 700 for a solid-foil VAWT. The base is referred to a quasi-conical rather than merely conical because the preferred surfaces of rotation are not comprised of a section of a cone, but rather are complex concave shapes. As shown in FIGS. 15 and 16, the intersection of a foil and a quasi-conical base 700 is preferably faired with a concave fillet 702 to reduce turbulence. As compared to conventional foil-to-base connections, in which the foil and base merely meet at roughly 90°, a quasi-conical base is strong and reduces drag by reducing the overall surface over which the relevant fluid flows (referred to at times as "wetted surface"). As shown in FIG. 18, a quasi-conical base can also provide sufficient space within the base for all or a portion of the generator (or other device that the turbine is driving), thus reducing bearing loading and permitting a more compact installation.

Perpendicular-axis turbines are subject to the Magnus effect (also at times referred to as the Flettner effect), whereby an object's rotation affects its path through a fluid, or if the object is in a fixed position or moving but mounted in such a way that its path cannot be affected by a fluid flowing past it, the flowpath of the fluid is affected. The Magnus effect is understood to be a product of various phenomena including the Bernoulli effect and the formation of boundary layers in the medium around rotating objects.

The deflection of the fluid flow caused by the rotation of a perpendicular-axis turbine can be used to obtain desired flow patterns in the case of arrays of such turbines and can also be used to deflect air flow over a moving vehicle. The front ends of modern large trucks, particularly long-haul trucks, are often shaped to reduce air drag by smoothly (or at least as smoothly as the usual constraints on the design of the vehicle permit) diverting air over (and, typically to a lesser extent, to the sides) of the truck. The diversion of air over a moving vehicle typically causes a downward force on the vehicle, leading to increased tire wear. Alternatively, a perpendicular-axis turbine mounted at the front of a vehicle will both divert air over the vehicle due to the Magnus effect and drive a rotation driven device (such as a generator or refrigeration compressor).

Figure 19:
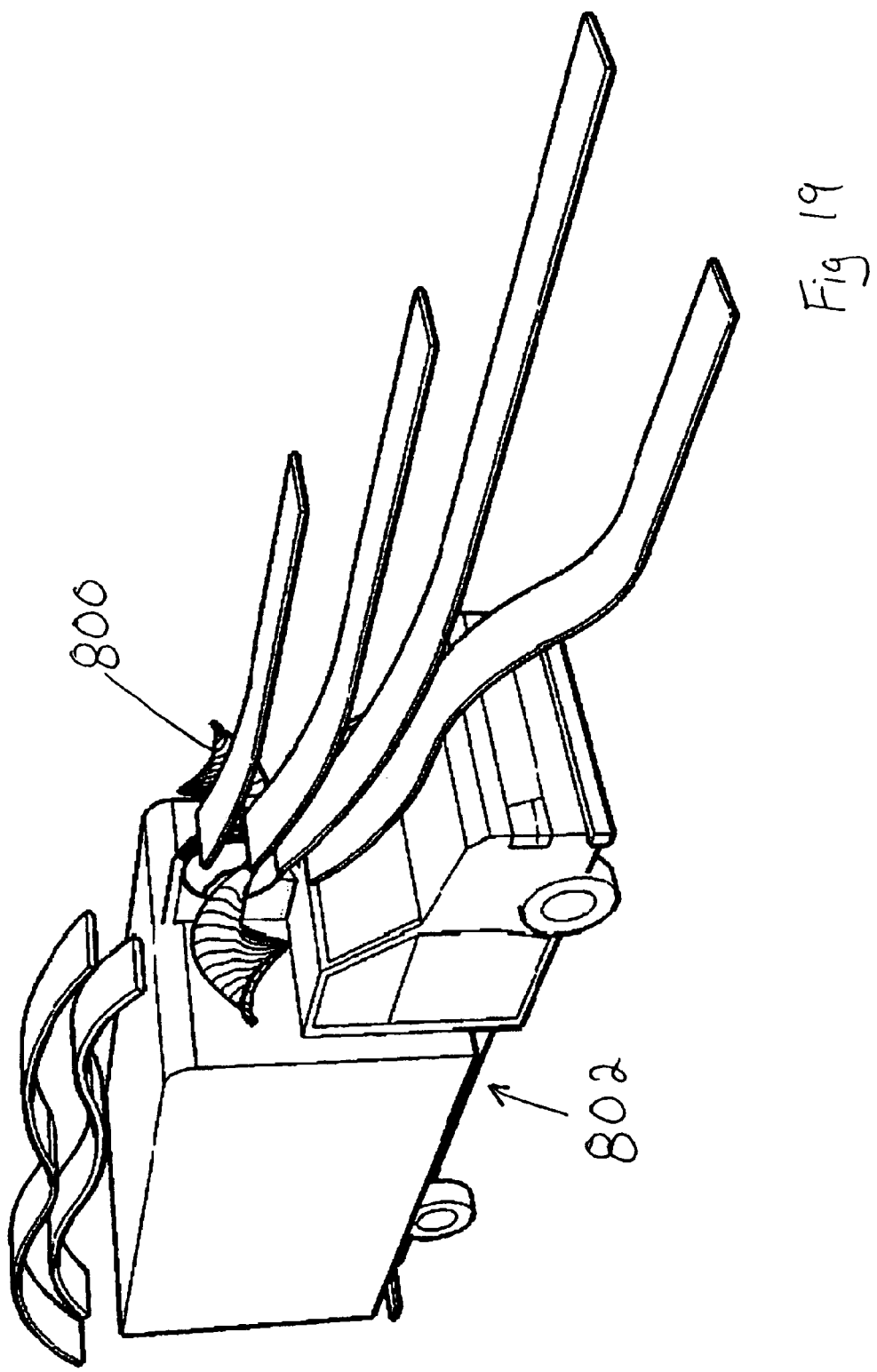
FIG. 19 is a perspective view of a truck having a double-turbine deflector mounted above the cab and ahead of the cargo compartment, wherein the general flow path of air over the truck is roughly indicated by curved bands.
Figure 20:
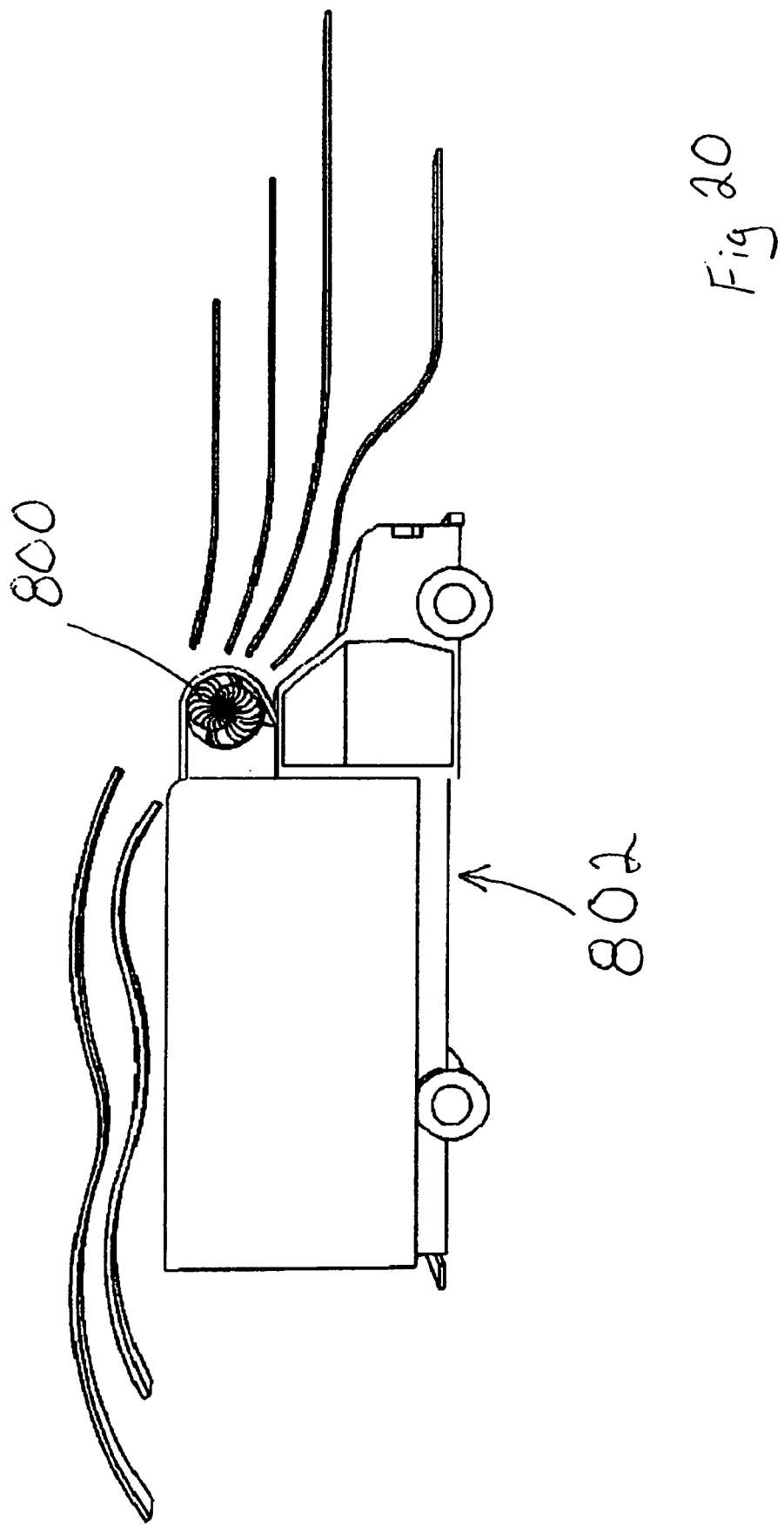
FIG. 20 is a side elevation view of the truck and double-turbine deflector shown in FIG. 19.
Figure 21:
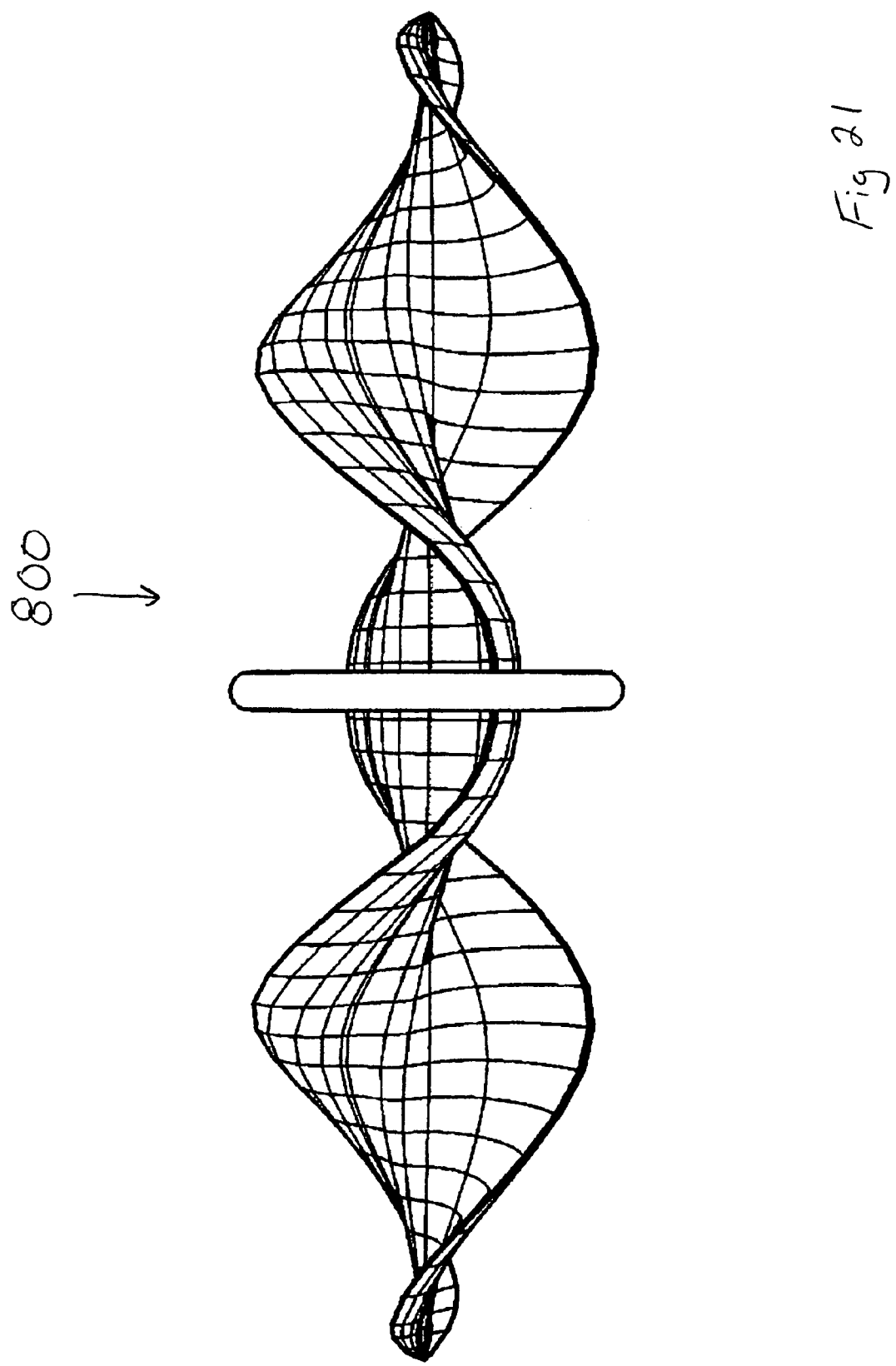
FIG. 21 is a front elevation view of the double-turbine deflector shown in FIGS. 19 and 20.

FIGS. 19 and 20 show a double-turbine deflector 800 mounted above the cab and ahead of the cargo compartment of a truck 802. Each turbine of the double-turbine deflector 800 is a solid-foil, helical, single-taper turbine. As a portion of the flow along the foils of a tapered turbine (as distinct from the general flow as affected by the Magnus effect), is from the base of the turbine (i.e. the widest part of a single-taper turbine) toward the other end of the turbine (i.e. the top in a conventionally oriented VAWT), the double-turbine deflector also acts to divert a portion of the air through which the truck 802 is passing towards each side of the vehicle. FIG. 21 shows a double-turbine deflector 800 suitable for mounting on a vehicle.

It has been found that turbines of the type generally described herein may usefully function with the fluid flow at an angle other than roughly 90° to the turbine's axis of rotation.

Canting a turbine of the present invention, such that the non-mount end of the turbine is tilted downstream with the turbine axis of rotation in the range of about 5° to 15° (and preferably about 7°) from perpendicular to the flow direction, enhances the performance of the turbine. It is understand that the benefits of such canting are best obtained when the canting is properly oriented with respect to the flow direction. However, the canting and flow direction need not be perfectly aligned and the canting is understood to at least not have a detrimental effect on performance, as compared to a turbine oriented to be perpendicular to all general possible flow directions, through about 180° of flow directions (i.e. 90° to either side of the alignment of the cant with the flow direction). However, canting is best used in situations where the flow direction is fairly constant, for example, with water turbines in rivers, and perhaps, with wind turbines in locations subject to persistent winds such as the trade winds.

Canting can also be used where the turbine mounting structure can reorient relative to the flow direction, for example, in the case of water turbines mounted on barges in tidal flows, the barges could be anchored so as to be free to self orient relative to the flow. Alternatively, if the installation location did not permit such self orientation of the barge, flow sensors, computer controllers and mechanical devices, likely powered by the turbine, could be used to alter the cant of the turbine relative to the barge.

Figure 22:
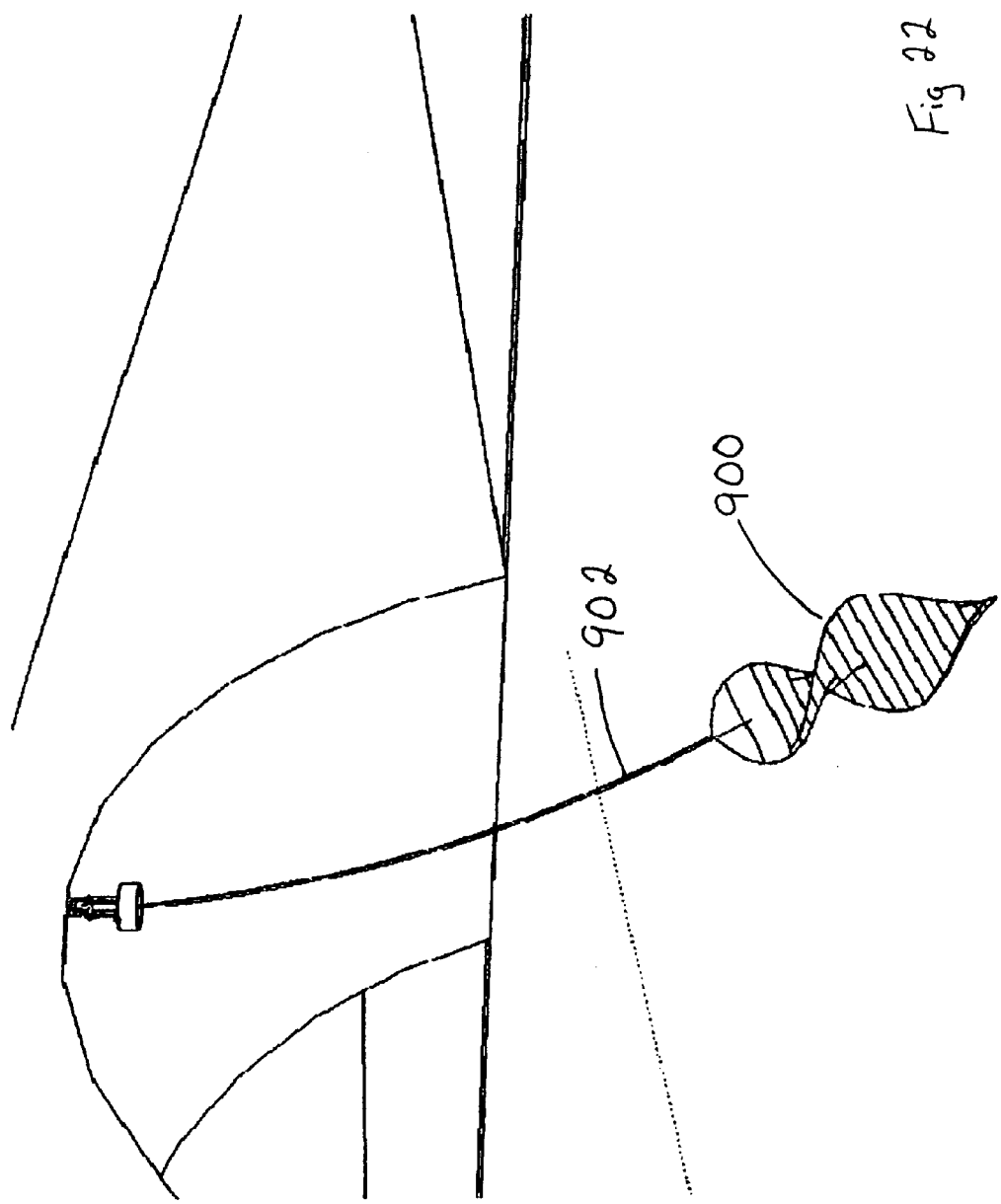
FIG. 22 is a perspective view showing a solid-foil, helical, double-taper water turbine suspended in flowing water via a flexible drive cable.

An alternative to a shaft-mounted water turbine, that provides self-alignment and canting (though the canting angle is not as controlled as in the case of a shaft-mounted water turbine) is shown in FIG. 22. As shown in FIG. 22 a solid-foil, helical, double-taper water turbine 900 may be used to generate rotary motion from flowing water by being suspended in the flowing water via a flexible drive cable 902. Such a configuration is relatively inexpensive to install and permits the turbine to accommodate changes in the direction of water flow (such as for example, when the currents are tidal). The flexible nature of the mount also means that, as compared to a rigidly mounted turbine, the water turbine 900 is less susceptible to damage from floating or partially submerged items (e.g. logs) in the water. The orientation of the water turbine 900 relative to the flow direction (i.e. at an angle other than 90°) means that the flow of water flow over the water turbine 900 tends to wash away smaller items (e.g. plastic bags, seaweed etc.) that might otherwise adhere to the water turbine 900, reducing its efficiency.

Figure 23:
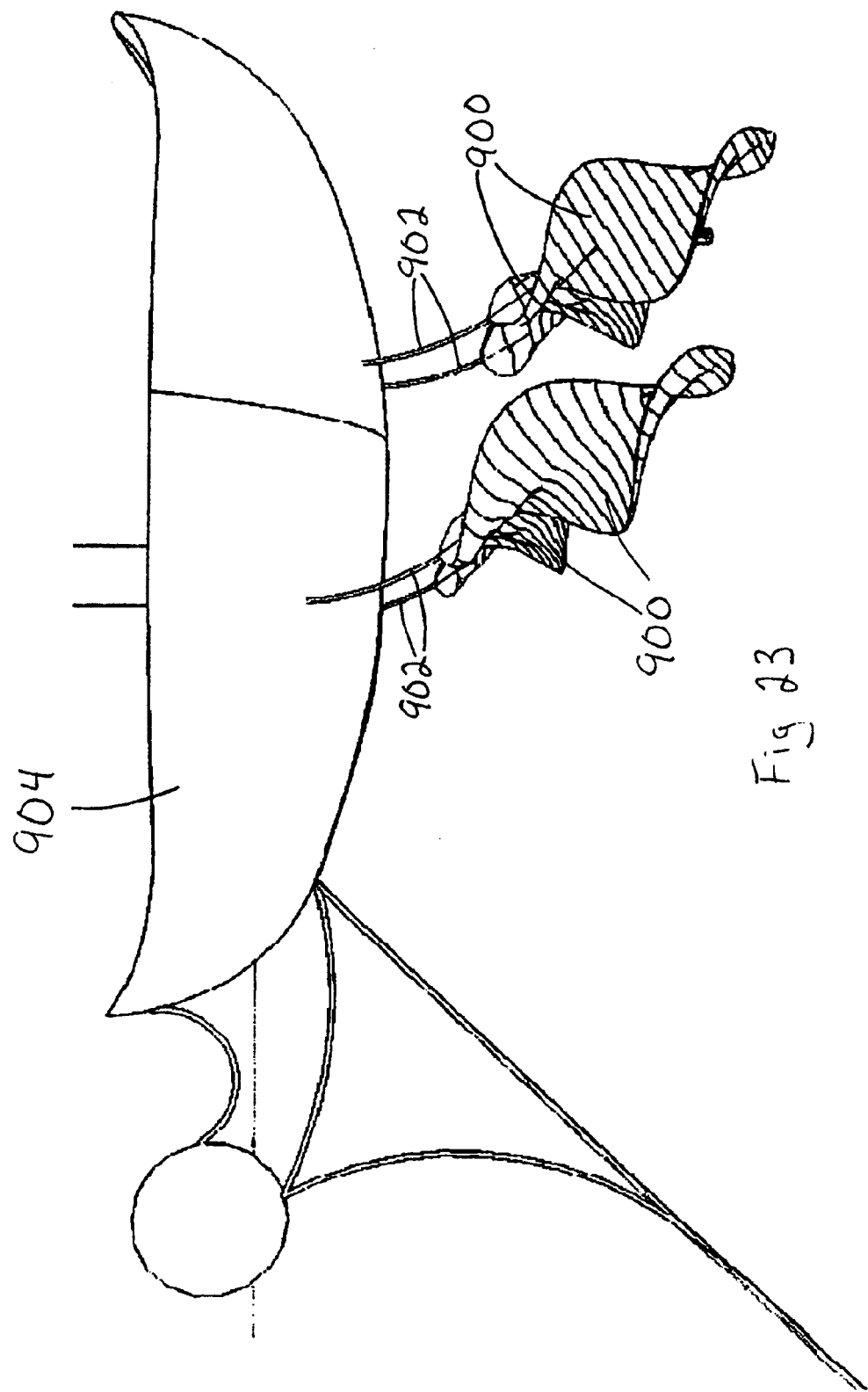
FIG. 23 is a side elevation view showing an array of four solid-foil, helical, double-taper water turbines suspended in flowing water and connected to a tethered floating vessel via flexible drive cables.
Figure 24:
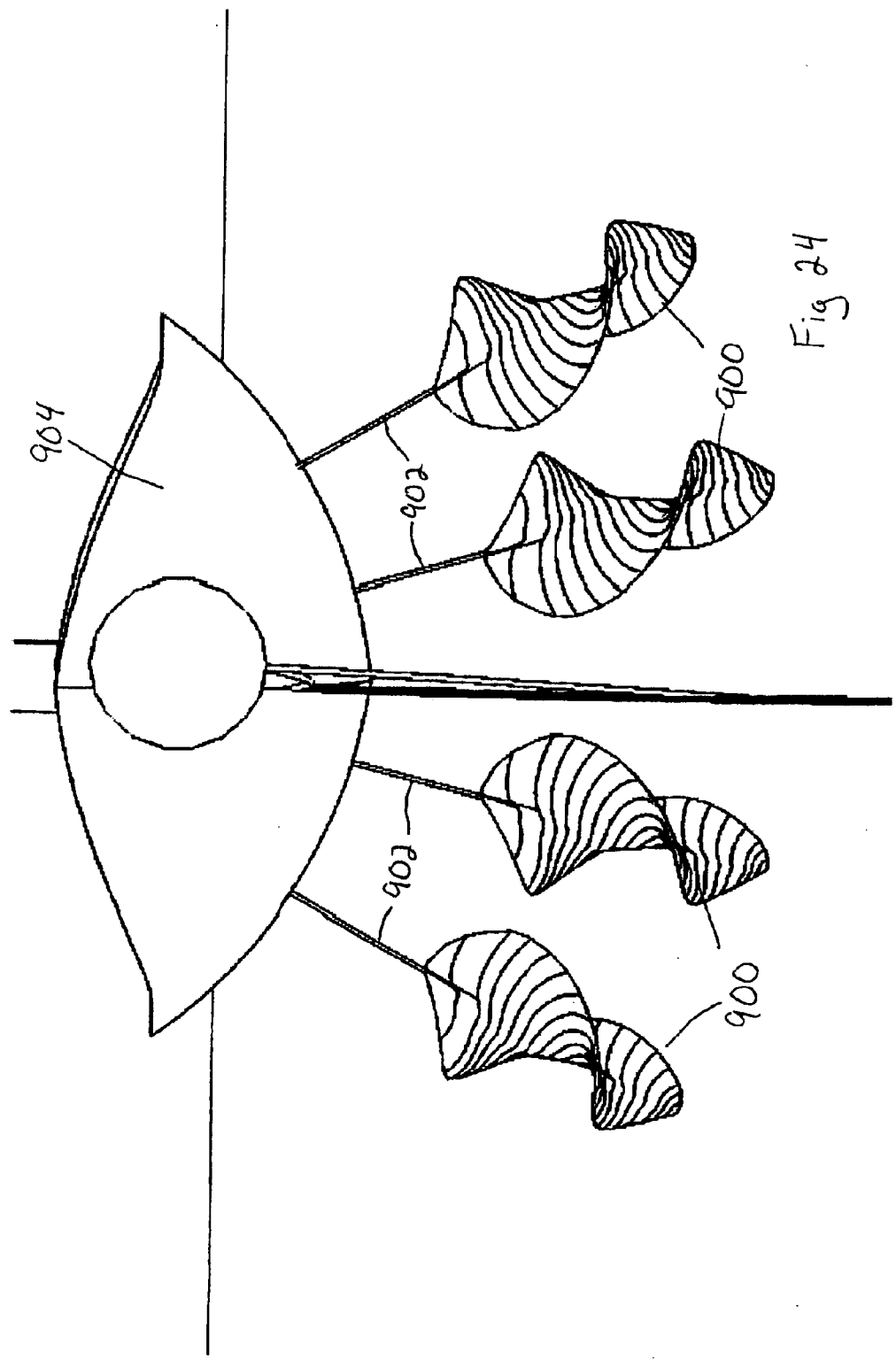
FIG. 24 is a front elevation view of the turbine array and vessel shown in FIG. 23.

FIGS. 23 and 24 show an array of four solid-foil, helical, double-taper water turbines 900 suspended in flowing water and connected to a tethered floating vessel 904 via flexible drive cables 902. The water turbines 900 may be configured and positioned to take advantage of the Magnus effect. As shown in FIG. 24, each of the pair of water turbines 900 on each side of the floating vessel 904, is configured to rotate in the opposite direction from the other pair of water turbines 900.

Figure 25:
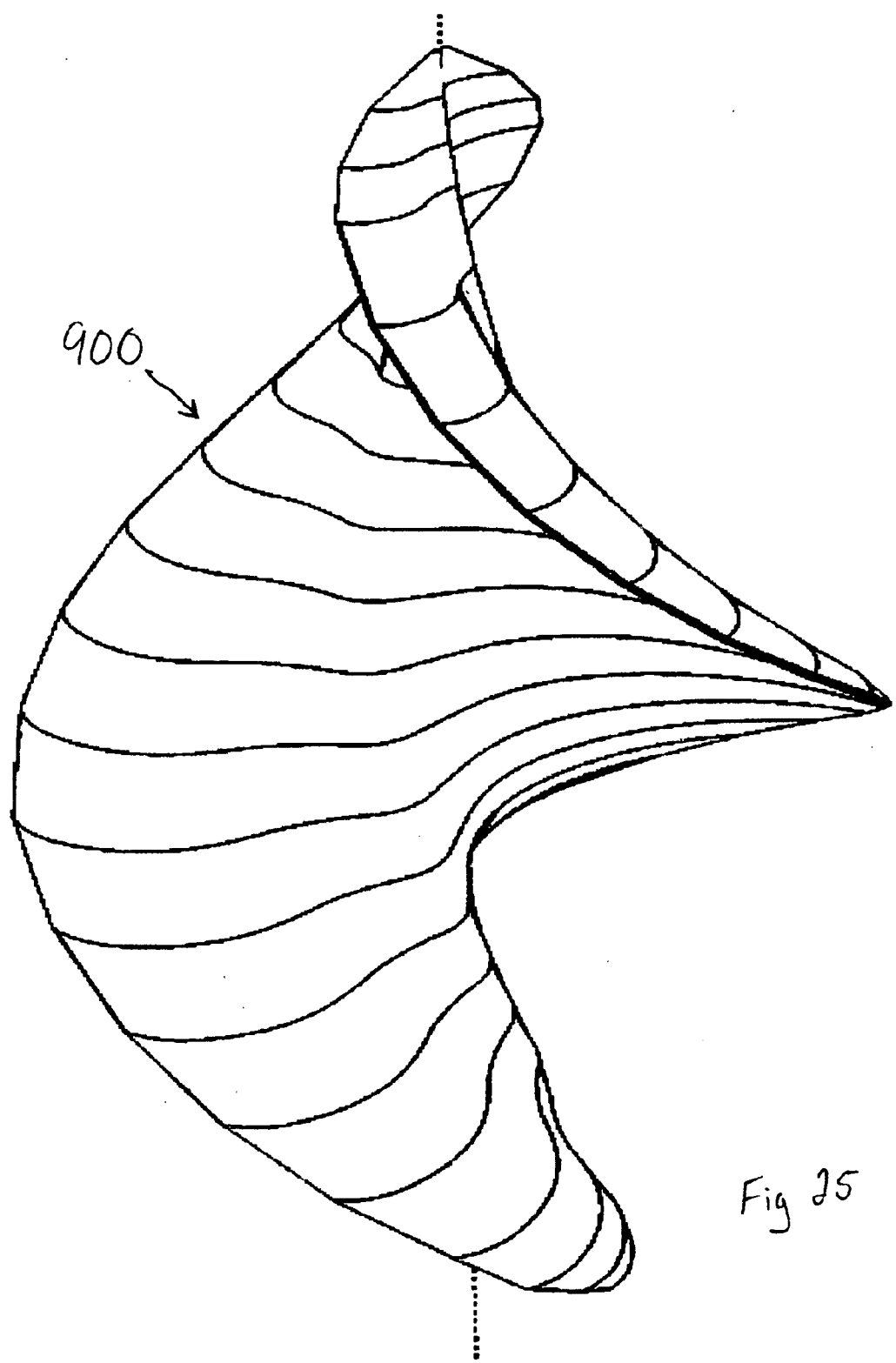
FIG. 25 is a perspective view of an exemplary solid-foil, helical, double-taper water turbine of the type shown in FIGS. 22, 23 and 24.
Figure 26:
FIG. 26 is a perspective view of the water turbine shown in FIG. 25, shown at a different rotational position.
Figure 27:
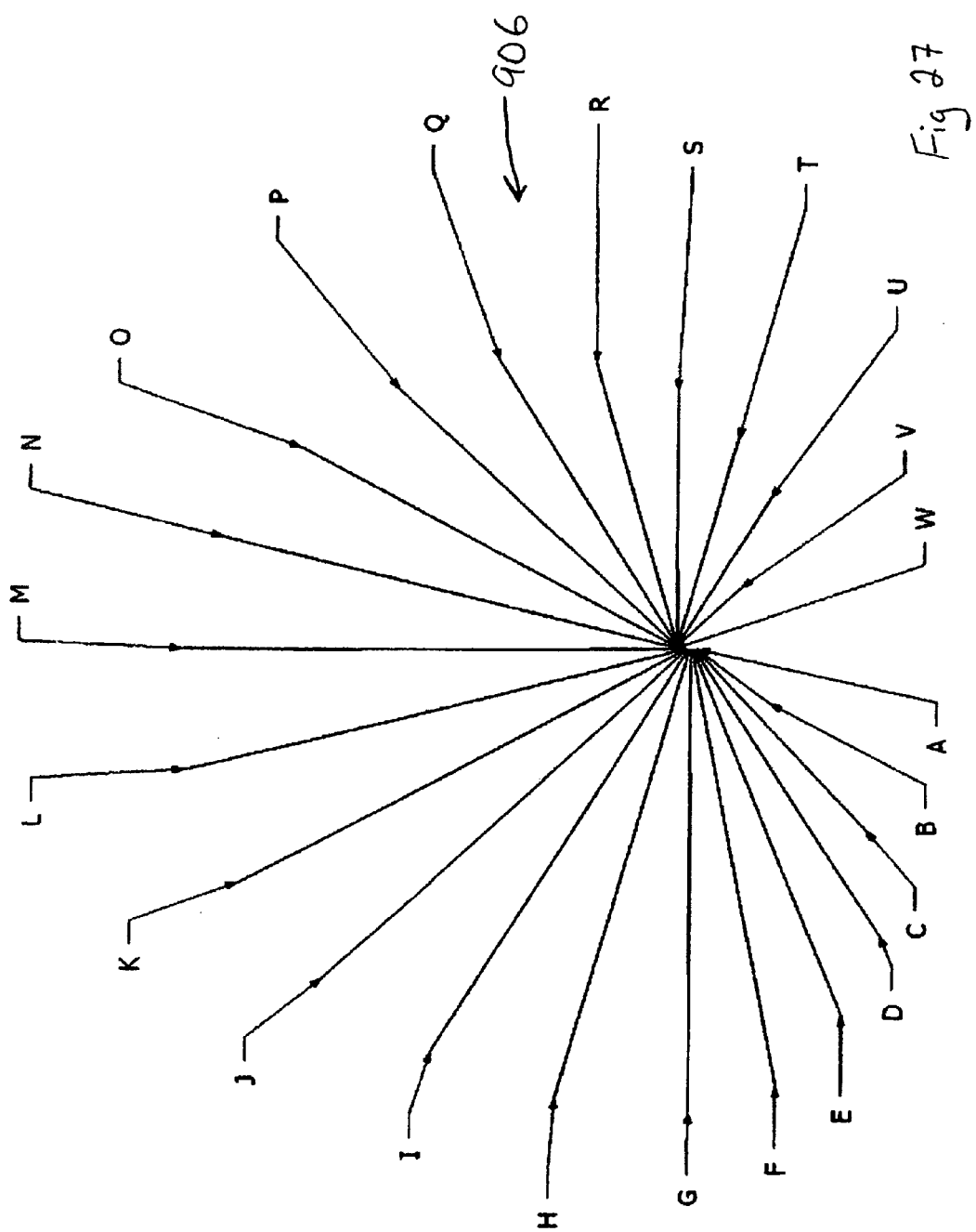
FIG. 27 is a top-view schematic representation showing selected chord/radius lines of the water turbine shown in FIGS. 25 and 26.

FIGS. 25 and 26 show an exemplary solid-foil, helical, double-taper water turbine 900 suitable for use in the arrangements shown in FIGS. 22, 23 and 24. FIG. 27 shows chord/radius lines of the water turbine 906 shown in FIGS. 25 and 26. The relative dimensions of the chord lengths at different distances from the end of the turbine furthest from the connection point of the flexible cable (and at different relative angles) are given in the following table.

| Layer Starting from lowest | Chord length relative to longest chord/widest radius | Height above base relative to longest chord/widest radius | Angle of chord line |
| --- | --- | --- | --- |
| A | 0 | 0 | 0 |
| B | 18 | 10 | 10 |
| C | 51.2 | 30 | 20 |
| D | 71.8 | 50 | 30 |
| E | 84.5 | 70 | 40 |
| F | 96 | 90 | 50 |
| G | 100 | 110 | 60 |
| H | 100 | 130 | 70 |
| I | 100 | 150 | 80 |
| J | 100 | 170 | 90 |
| K | 100 | 190 | 100 |
| L | 100 | 210 | 110 |
| M | 97 | 230 | 120 |
| N | 92.2 | 250 | 130 |
| O | 85.7 | 270 | 140 |
| P | 78 | 290 | 150 |
| Q | 71 | 310 | 160 |
| R | 63.2 | 330 | 170 |
| S | 55 | 350 | 180 |
| T | 46.2 | 370 | 190 |
| U | 37 | 390 | 200 |
| V | 18.3 | 410 | 210 |
| W | 0 | 420 | 220 |

Figure 28:
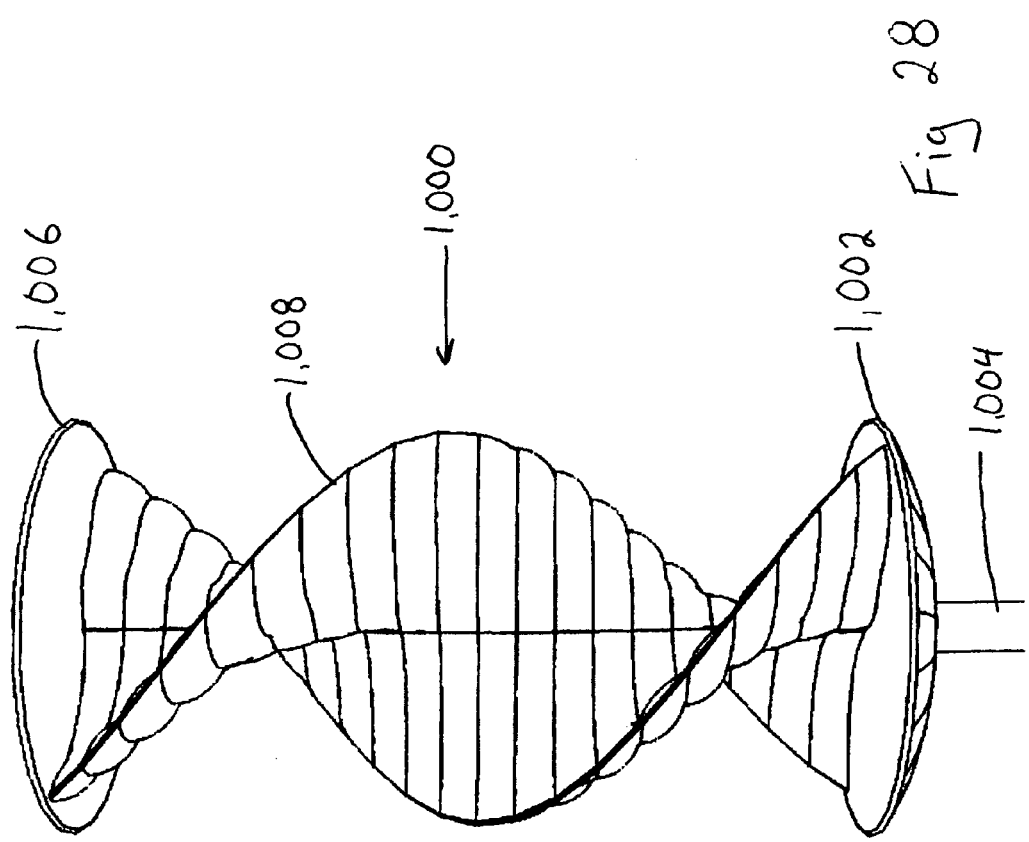
FIG. 28 is a perspective view showing a helical, ram-air VAWT.

FIG. 28 shows a collapsible, helical, ram-air VAWT 1000. As shown in FIG. 28, and with respect to some features in greater detail in FIGS. 29 and 30, the ram-air VAWT 1000 comprises a bottom plate 1002 mounted on a column 1004 and a top plate 1006. The ram-air foil 1008 comprises a plurality of battens 1010, with each batten 1010 slidably mounted to a shaft 1012 at a hole passing through the batten 1010. Relative rotational movement of the battens 1010 about the shaft 1012 is impeded; preferably, the shaft 1012 is splined and the holes in the battens 1010 are configured to mate with the splines. A fabric skin 1014 is attached to each edge of each batten 1010 so as to form the surface of the ram-air foil 1008. Running the length of each outer edge of the ram-air foil 1008, there is a vent 1016.

In use, each of the cells 1018, i.e. the spaces between the two fabric skins 1014 and the battens 1010, fill with air forced into the cells 1018 via the vents 1016. The battens 1010 and fabric skins 1014 are configured such that the resulting pressure in the cells 1018 forces the fabric skins 1014 into a desired foil shape.

The ram-air VAWT 1000 may be collapsed by bringing the top plate 1006 and bottom plate 1002 closer together so as to bring the battens 1010 into a stacked configuration, which significantly reduces the swept area and loosens the fabric skins 1014 causing turbulence in the air flow over the collapsed ram-air VAWT 1000, resulting in minimal or non-existent rotational torque. The ram-air VAWT 1000 may be configured such that the top plate 1006 is slidably mounted on the ram-air shaft and the bottom plate 1002 is fixed to the ram-air shaft 1012, such that the collapse of the ram-air VAWT 1000 may be effected by sliding the top plate 1006 down the ram-air shaft 1012. Alternatively, the top-plate 1006 may be fixed to the ram-air shaft 1012 and the ram-air shaft 1012 may be slidably mounted relative to the bottom plate 1002, such that the collapse of the ram-air VAWT 1000 may be effected by drawing the ram-air shaft 1012 into the column 1004.

As shown in FIG. 32, in one embodiment, each batten 1010 is composed of two half-battens 1020, in use attached one to the other with conventional fasteners. A portion of the fabric skin 1014 is sandwiched between the half-battens 1018, thus securing the fabric skin 1014 to the batten 1010.

Figure 33:
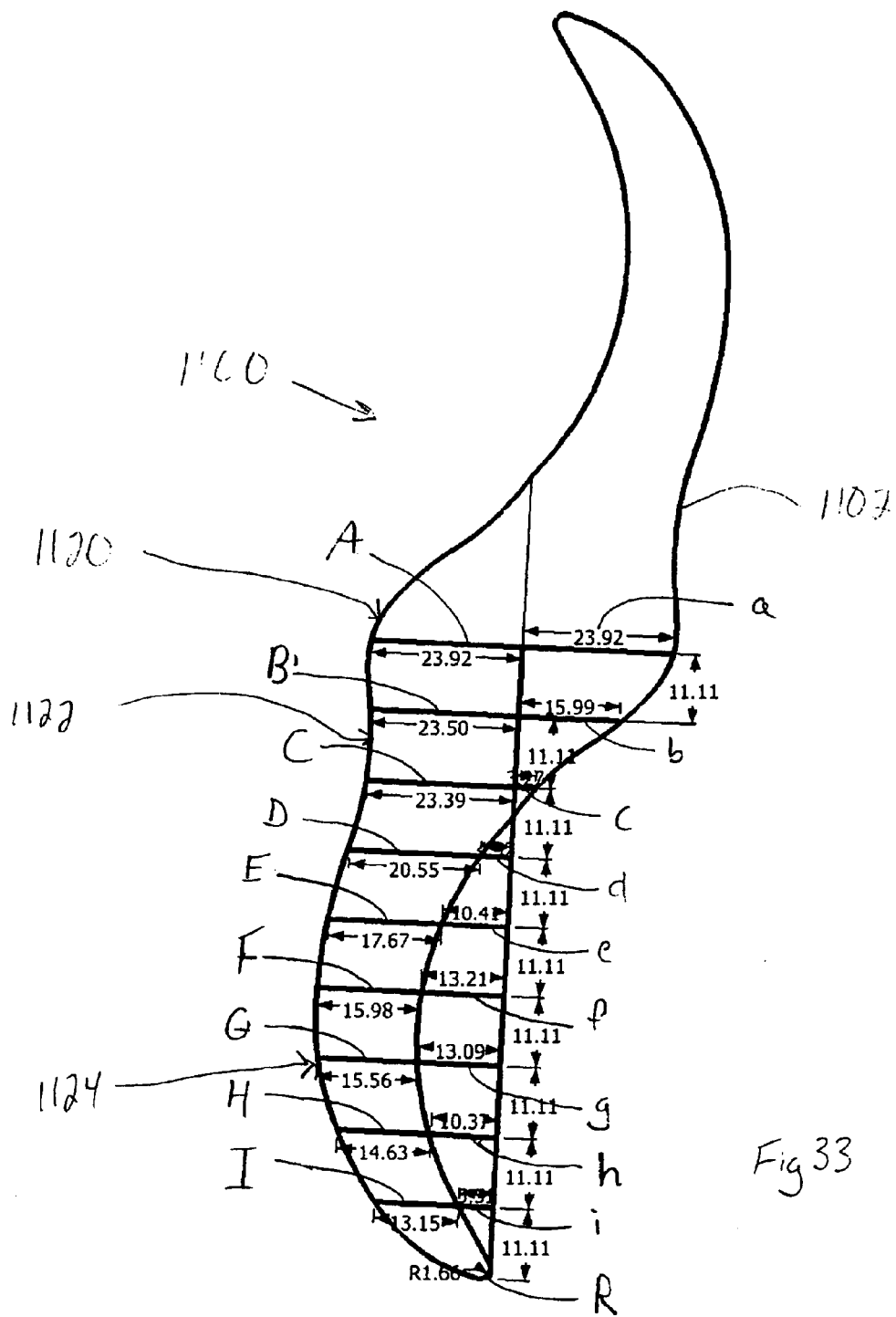
FIGS. 33 to 40 are a series of foil-section views of a solid-foil helical turbine embodiment of the present invention having a double-curve foil section and foil sections that change along the span of the foil, wherein each section view indicates offset dimensions taken from a chord/radius line, as follows.
Figure 34:
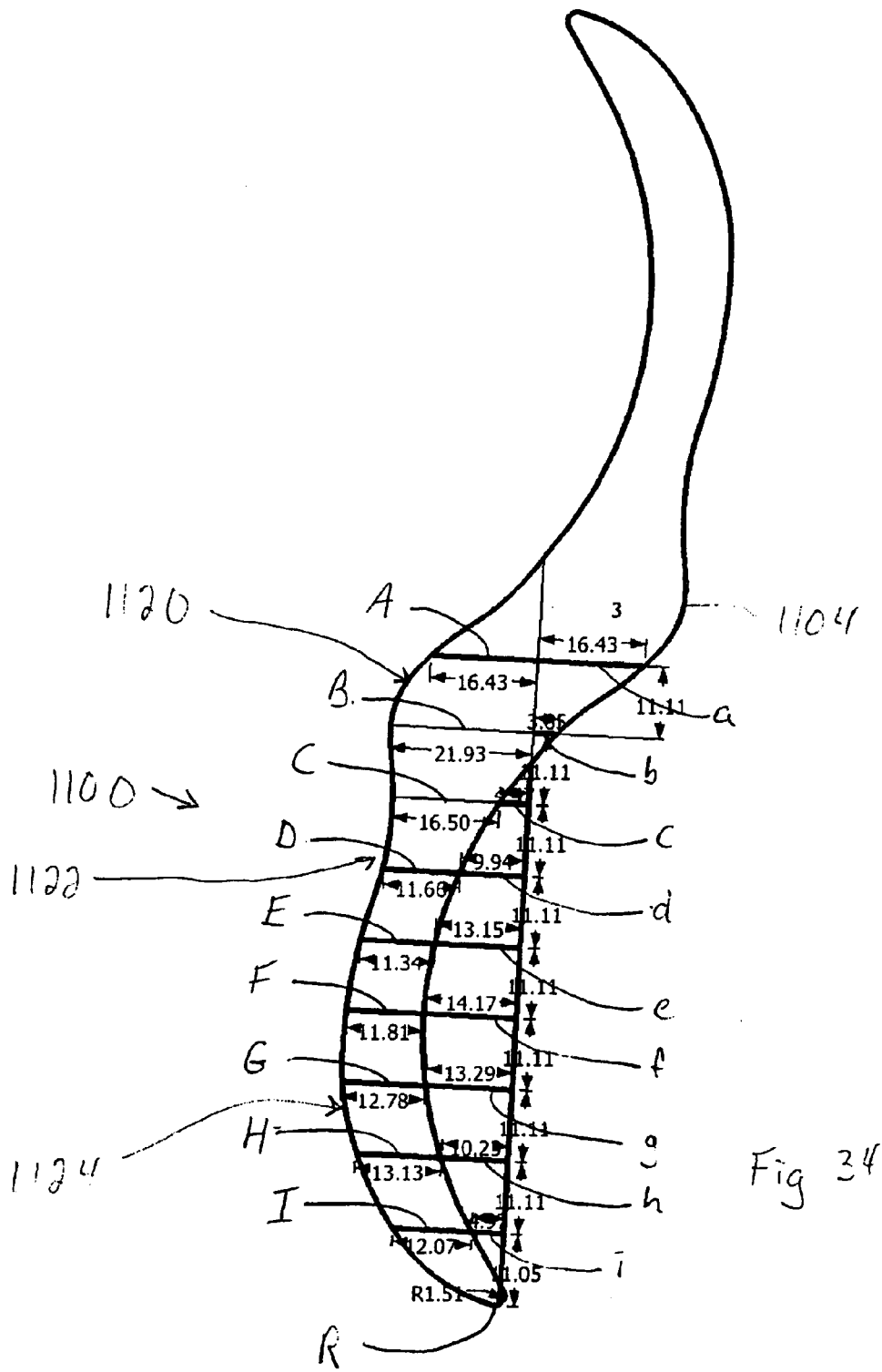
Figure 35:
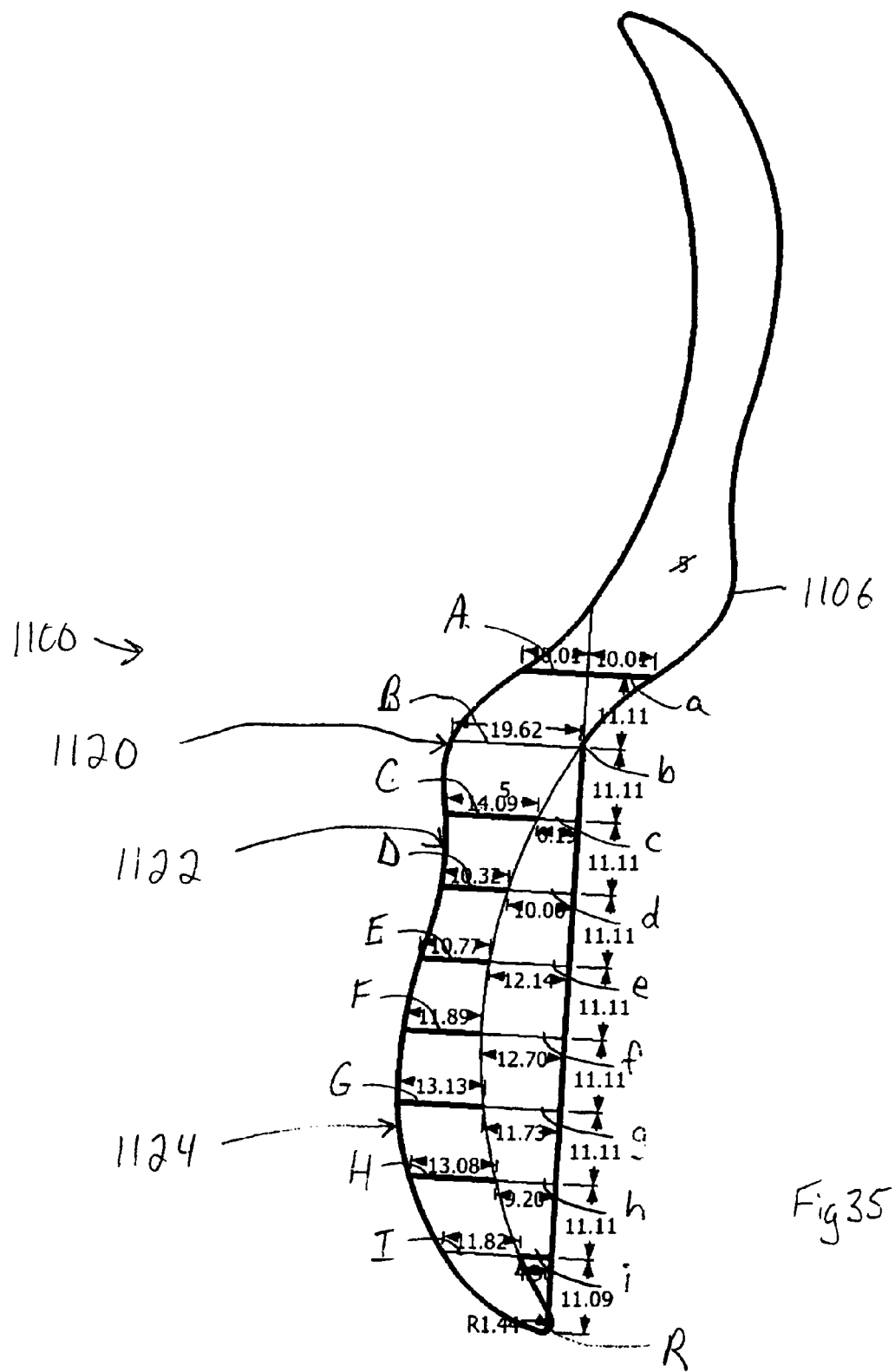
Figure 36:
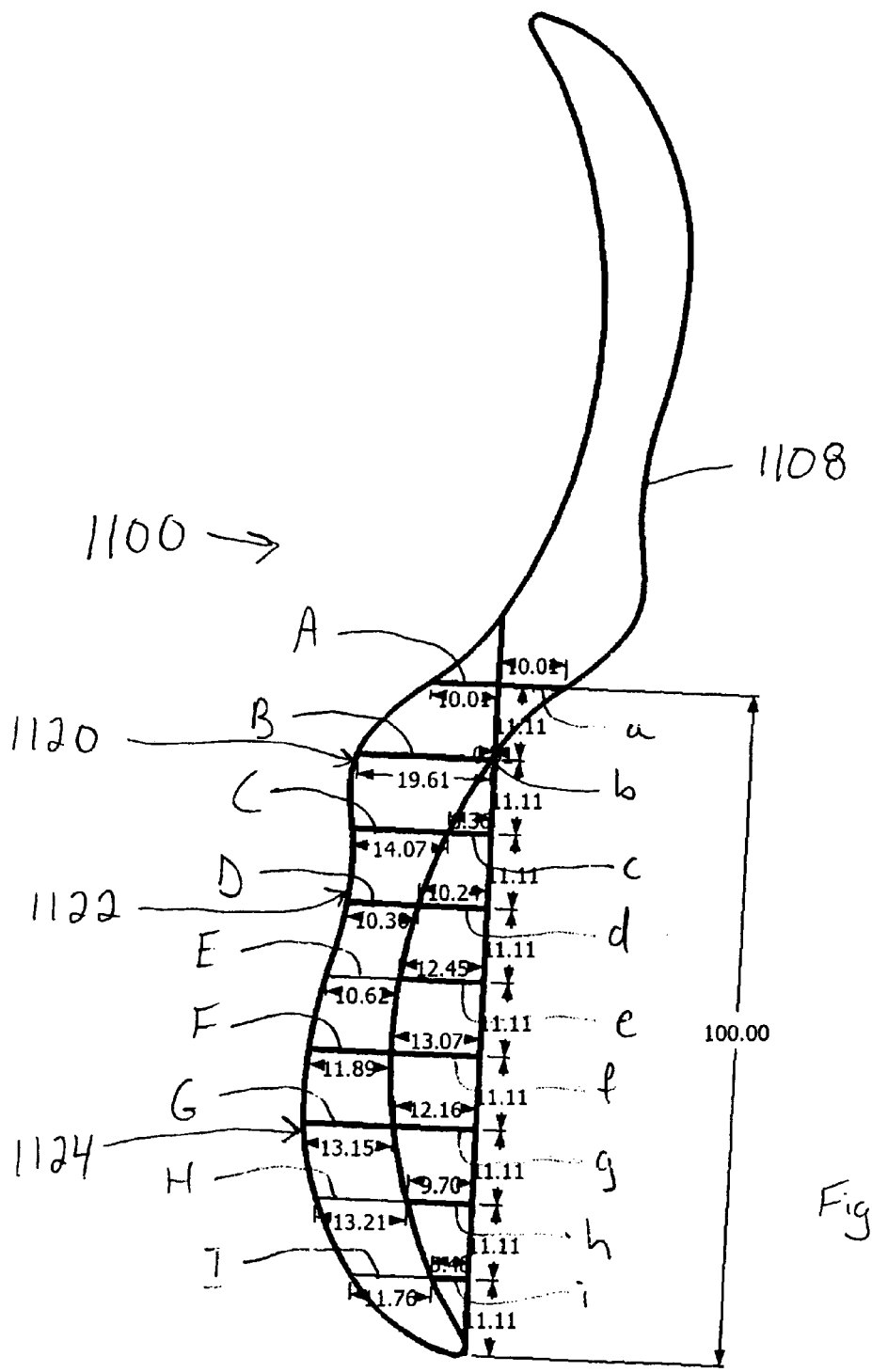
Figure 37:
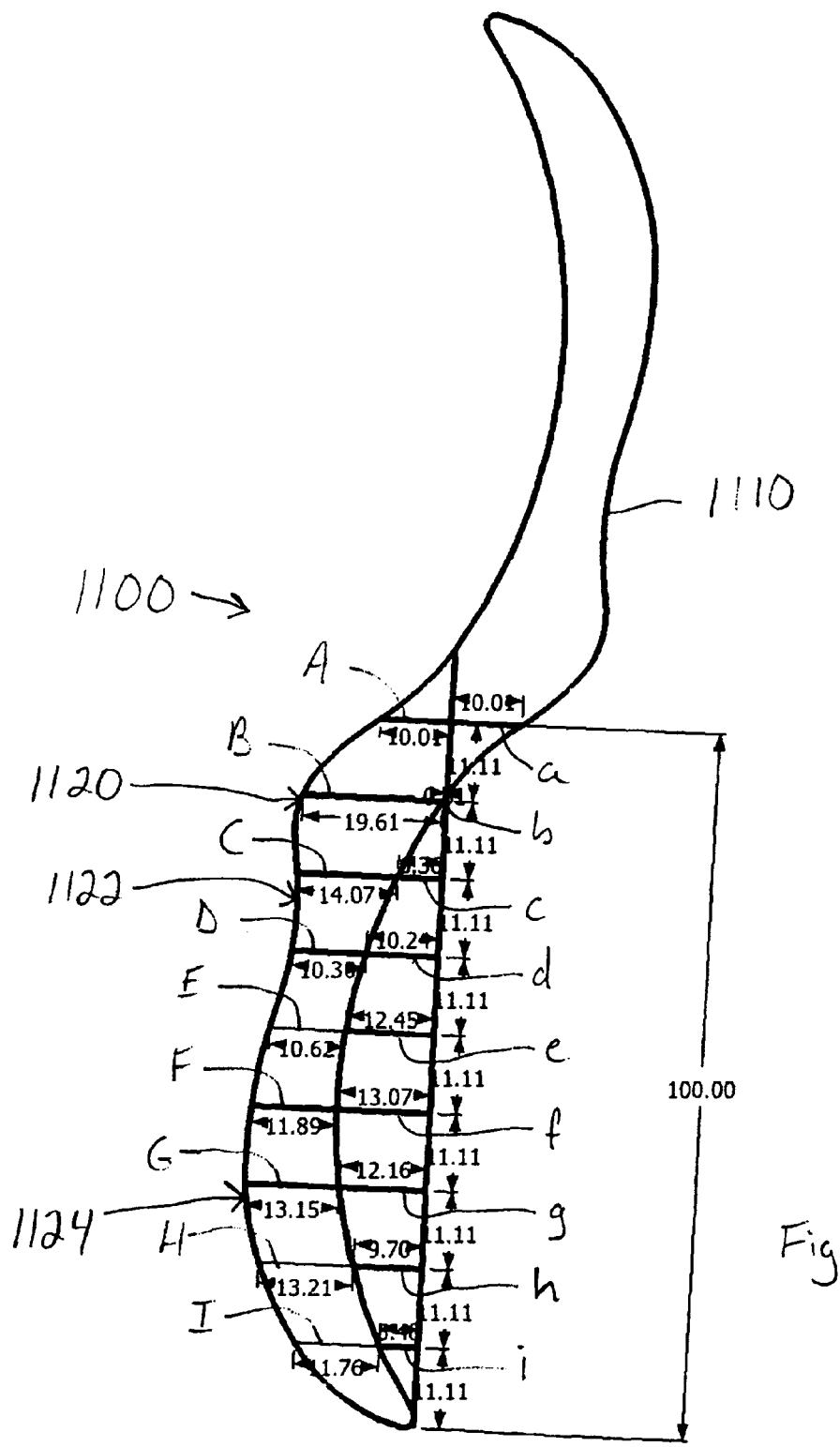
Figure 38:
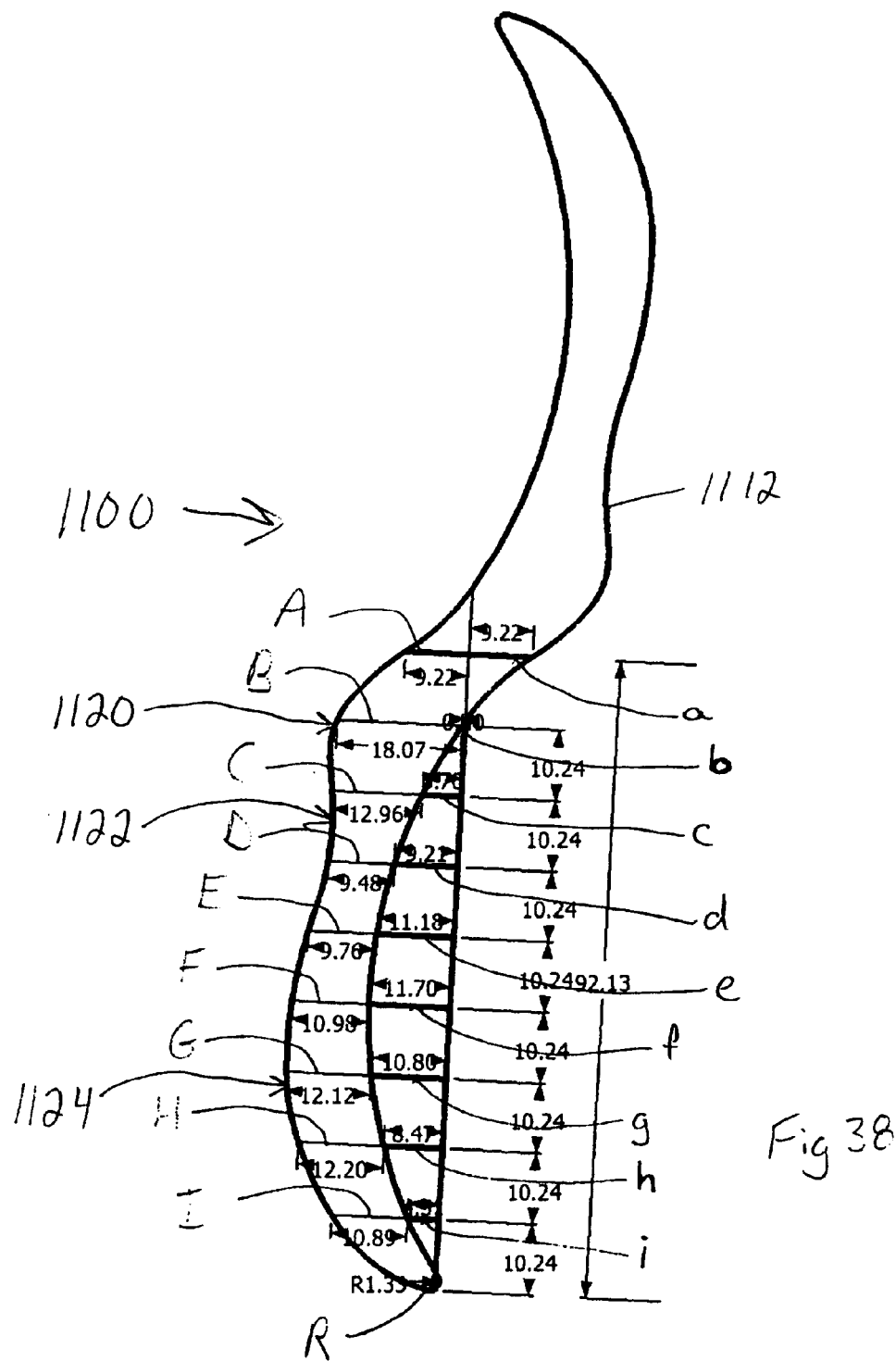
Figure 39:
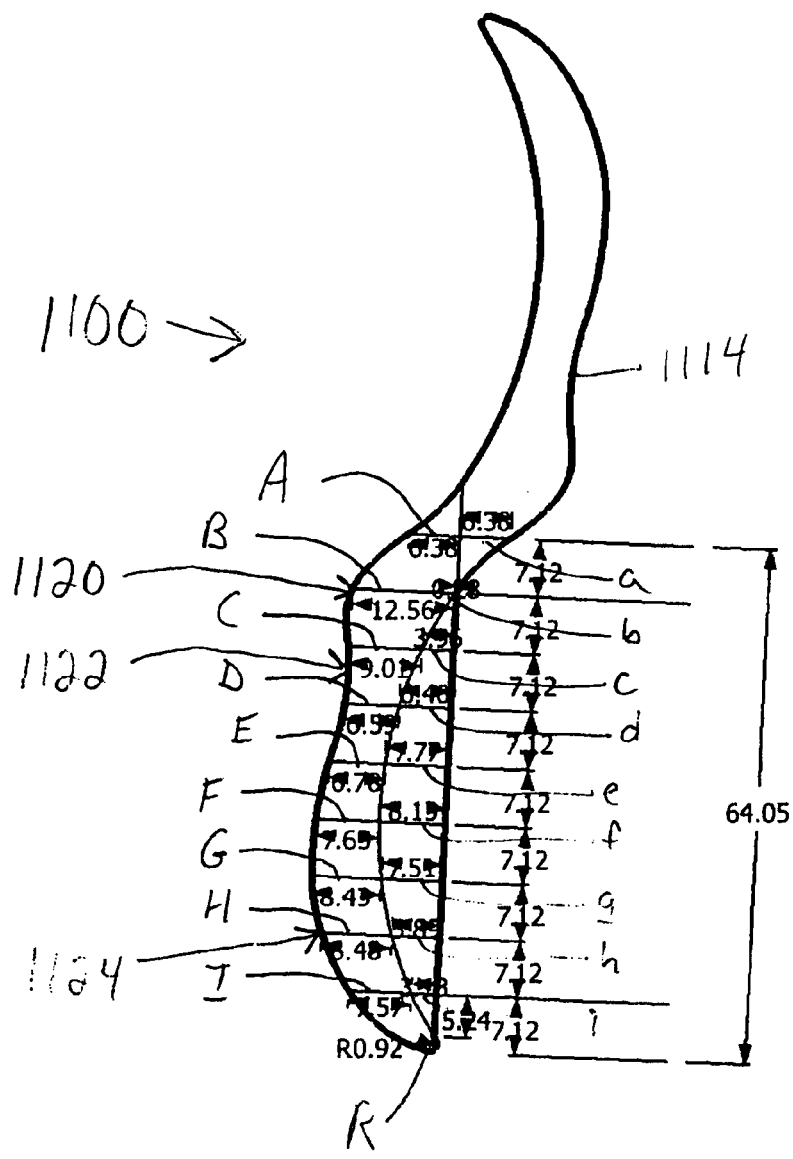
Figure 40:
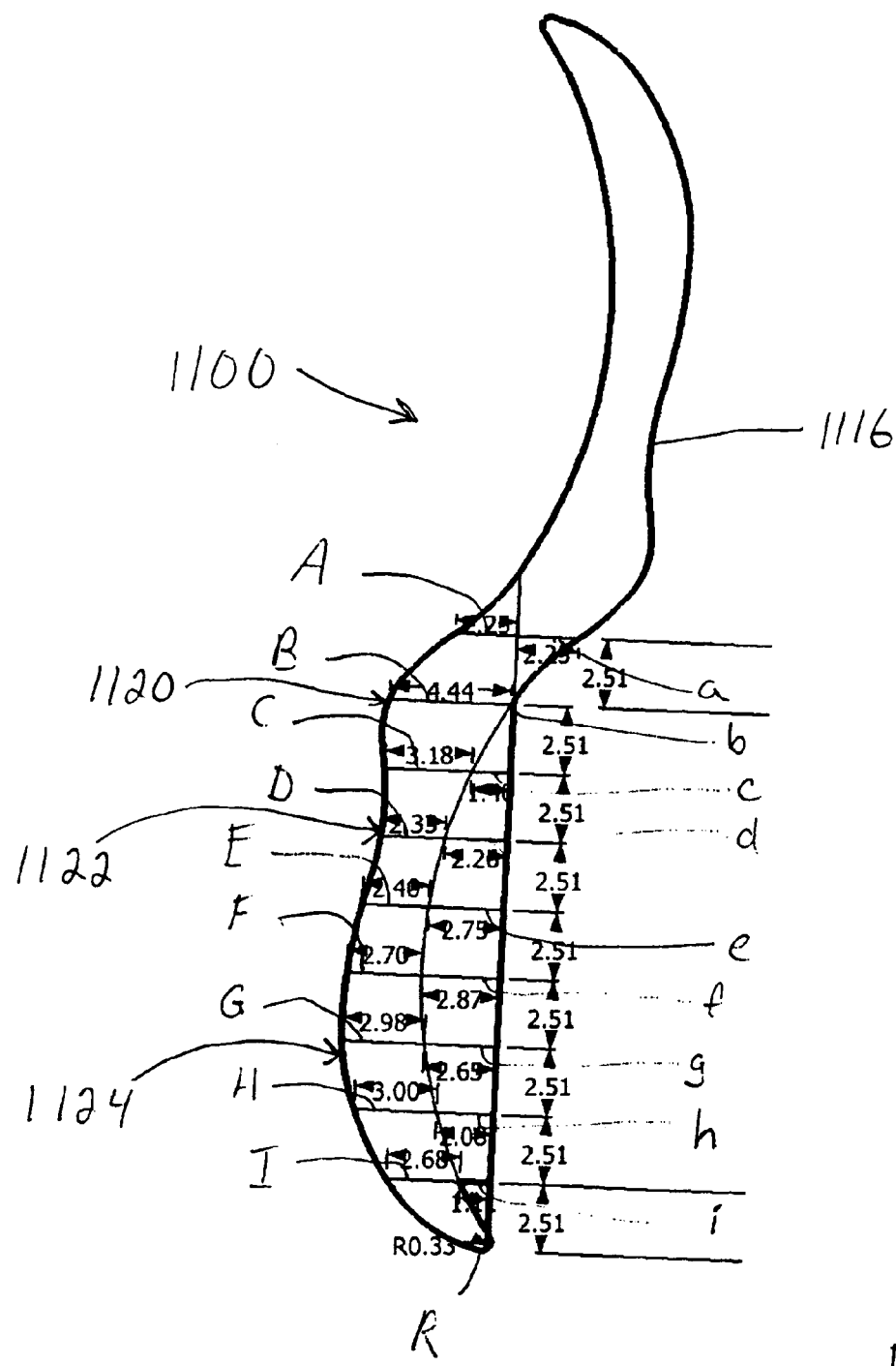

FIGS. 33 to 40 show a solid-foil helical non-constant-section turbine 1100 embodiment of the present invention having a double-curve foil section. The solid-foil helical non-constant-section turbine 1100 is "non-constant-section" in that, the relative proportions and relative locations of the features of the foil sections change along the span of the foil. The section views, which indicate offset dimensions taken from chord/radius lines, are as follows:

a) FIG. 33 is a foil-section of a mount-end section 1102, in the vicinity of the mount end;
b) FIG. 34 is a foil-section of a second section 1104 at 30° of twist from the mount-end section 1102;
c) FIG. 35 is a foil-section view of a third section 1106 at 30° of twist from the second section 1104;
d) FIG. 36 is a foil-section view of a fourth section 1108 at 30° of twist from the third section 1106;
e) FIG. 37 is a foil-section view of a fifth section 1110 at 30° of twist from the fourth section 1108;
f) FIG. 38 is a foil-section view of a sixth section 1112 at 30° of twist from the fifth section 1110;
g) FIG. 39 is a foil-section view of a seventh section 1114 at 30° of twist from the sixth section 1112; and
h) FIG. 40 is a foil-section view of an eighth section 1116 at 30° of twist from the seventh section 1114 and in the vicinity of the non-mount end.

As mentioned above, the solid-foil helical non-constant-section turbine 1100 is double curved in that the surface of the foil furthest from the chord/radius line comprises an outer variable convex section 1120 an intermediate variable concave section 1122 and an inner variable convex section 1124.

The dimensions provided with respect to FIGS. 33 to 40 (including, the radius of the section, the spacing of the offset lines, and the offset dimensions (indicated by upper and lower case letters)), are all given in terms of percentages of the maximum radius of the solid-foil helical non-constant-section turbine 1100.

The radius of the mount-end section 1102 is 100% of the maximum radius of the solid-foil helical non-constant-section turbine 1100. The offset lines in FIG. 33 are spaced at 11.11% of the maximum radius of the solid-foil helical non-constant-section turbine 1100. The dimensions indicated in FIG. 33 are as follows:

| | |
|---|---|
| A | 23.92 |
| a | 23.92 |
| B | 23.50 |
| b | 15.99 |
| C | 23.39 |
| c | 3.27 |
| D | 20.55 |
| d | 4.12 |
| E | 17.67 |
| e | 10.41 |
| F | 15.98 |
| f | 13.21 |
| G | 15.56 |
| g | 13.09 |
| H | 14.63 |
| h | 10.37 |
| I | 13.15 |
| i | 5.31 |
| R | 1.66 |

The radius of the second section 1104 is 100% of the maximum radius of the solid-foil helical non-constant-section turbine 1100. The offset lines in FIG. 34 are spaced at 11.11% of the maximum radius of the solid-foil helical non-constant-section turbine 1100. The dimensions indicated in FIG. 34 are as follows:

| | |
|---|---|
| A | 16.43 |
| a | 16.43 |
| B | 21.93 |
| b | 3.85 |
| C | 16.50 |
| c | 4.47 |
| D | 11.66 |
| d | 9.94 |
| E | 11.34 |
| e | 13.15 |
| F | 11.81 |
| f | 14.17 |
| G | 12.78 |
| g | 13.29 |
| H | 13.13 |
| h | 10.25 |
| I | 12.07 |
| i | 4.97 |
| R | 1.51 |

The radius of the third section 1106 is 100% of the maximum radius of the solid-foil helical non-constant-section turbine 1100. The offset lines in FIG. 35 are spaced at 11.11% of the maximum radius of the solid-foil helical non-constant-section turbine 1100. The dimensions indicated in FIG. 35 are as follows:

| | |
|---|---|
| A | 10.01 |
| a | 10.01 |
| B | 19.62 |
| b | 0 |
| C | 14.09 |
| c | 6.15 |
| D | 10.32 |
| d | 10.00 |
| E | 10.77 |
| e | 12.14 |
| F | 11.89 |
| f | 12.70 |
| G | 13.13 |
| g | 11.73 |
| H | 13.08 |
| h | 9.20 |

| | |
|---|---|
| I | 11.82 |
| i | 4.90 |
| R | 1.44 |

The radius of the fourth section 1108 is 100% of the maximum radius of the solid-foil helical non-constant-section turbine 1100. The offset lines in FIG. 36 are spaced at 11.11% of the maximum radius of the solid-foil helical non-constant-section turbine 1100. The dimensions indicated in FIG. 36 are as follows:

| | |
|---|---|
| A | 10.01 |
| a | 10.01 |
| B | 19.61 |
| b | 0.3 |
| C | 14.07 |
| c | 5.36 |
| D | 10.30 |
| d | 10.24 |
| E | 10.62 |
| e | 12.45 |
| F | 11.89 |
| f | 13.07 |
| G | 13.15 |
| g | 12.16 |
| H | 13.21 |
| h | 9.70 |
| I | 11.76 |
| i | 5.46 |

The radius of the fifth section 1110 is 100% of the maximum radius of the solid-foil helical non-constant-section turbine 1100. The offset lines in FIG. 37 are spaced at 11.11% of the maximum radius of the solid-foil helical non-constant-section turbine 1100. The dimensions indicated in FIG. 37 are as follows:

| | |
|---|---|
| A | 10.01 |
| a | 10.01 |
| B | 19.61 |
| b | 0.3 |
| C | 14.07 |
| c | 5.36 |
| D | 10.30 |
| d | 10.24 |
| E | 10.62 |
| e | 12.45 |
| F | 11.89 |
| f | 13.07 |
| G | 13.15 |
| g | 12.16 |
| H | 13.21 |
| h | 9.70 |
| I | 11.76 |
| i | 5.46 |

The radius of the sixth section 1112 is 92.13% of the maximum radius of the solid-foil helical non-constant-section turbine 1100. The offset lines in FIG. 38 are spaced at 10.24% of the maximum radius of the solid-foil helical non-constant-section turbine 1100. The dimensions indicated in FIG. 38 are as follows:

| | |
|---|---|
| A | 9.22 |
| a | 9.22 |
| B | 18.07 |
| b | 0.10 |
| C | 12.96 |
| c | 5.76 |
| D | 9.48 |
| d | 9.21 |
| E | 9.76 |
| e | 11.18 |
| F | 10.98 |
| f | 11.70 |
| G | 12.12 |
| g | 10.80 |
| H | 12.20 |
| h | 8.47 |
| I | 10.89 |
| i | 4.51 |
| R | 1.33 |

The radius of the seventh section 1114 is 64.05% of the maximum radius of the solid-foil helical non-constant-section turbine 1100. The offset lines in FIG. 39 are spaced at 7.12% of the maximum radius of the solid-foil helical non-constant-section turbine 1100. The dimensions indicated in FIG. 39 are as follows:

| | |
|---|---|
| A | 6.38 |
| a | 6.38 |
| B | 12.56 |
| b | 0.28 |
| C | 9.01 |
| c | 3.96 |
| D | 6.59 |
| d | 6.40 |
| E | 6.78 |
| e | 7.77 |
| F | 7.65 |
| f | 8.15 |
| G | 8.43 |
| g | 7.51 |
| H | 8.48 |
| h | 5.89 |
| I | 7.57 |
| i | 3.18 |
| R | 0.92 |

The radius of the eighth section 1116 is 22.59% of the maximum radius of the solid-foil helical non-constant-section turbine 1100. The offset lines in FIG. 40 are spaced at 2.51% of the maximum radius of the solid-foil helical non-constant-section turbine 1100. The dimensions indicated in FIG. 40 are as follows:

| | |
|---|---|
| A | 2.25 |
| a | 2.25 |
| B | 4.44 |
| b | 0 |
| C | 3.18 |
| c | 1.40 |
| D | 2.33 |
| d | 2.26 |
| E | 2.40 |
| e | 2.75 |
| F | 2.70 |
| f | 2.87 |
| G | 2.98 |
| g | 2.65 |
| H | 3.00 |

-continued

| | |
|---|---|
| h | 2.08 |
| I | 2.68 |
| i | 1.11 |
| R | 0.33 |

As can be seen in FIGS. 33 to 40, the relative locations and sizes of the outer variable convex section 1120, intermediate variable concave section 1122 and inner variable convex section 1124 are not constant along the span of the foil. In the vicinity of the mount end of the foil (i.e. mount-end section 1102), the inner variable convex section 1124 is proximate the axis of rotation, whereas in the other sections, the inner variable convex section 1124 is shifted towards the outer edge of the foil. As shown in FIG. 33, in the mount-end section 1102, the greatest offset dimension, corresponding to the location of the inner variable convex section 1124, is at the axis of rotation. As shown in FIGS. 35 through 40, the greatest offset dimension, corresponding to the location of the inner variable convex section 1124, is at B, that is about 11% along the chord length from the axis of rotation. Thus, the greatest dimension of the inner convex section as measured from a chord between the axis of rotation of the turbine and the outer edge of the foil is at a location normal to a location on the chord within about 12% of the chord length of the axis of rotation.

As well, in the vicinity of the mount end of the foil (i.e. mount-end section 1102), the ratio of the chord length/radius of the foil section to the width of the foil section is less than this ratio in the other sections. As shown in FIG. 33, in the mount-end section 1102, the offset dimension (C) corresponding to the intermediate variable concave section 1122, is 23.39, giving a ratio of the chord length/radius of the foil section to the width of the foil section of 100.00 to 23.39 (or 23.39%). As shown in FIG. 36, in the fourth section 1108, the offset dimension (D) corresponding to the intermediate variable concave section 1122, is 10.30, giving a ratio of the chord length/radius of the foil section to the width of the foil section of 100.00 to 10.30 (or 10.30%). As shown in FIG. 40, in the eighth section 1116, the offset dimension (D) corresponding to the intermediate variable concave section 1122, is 2.35, giving a ratio of the chord length/radius of the foil section to the width of the foil section of 22.59 to 2.35 (or 10.40%). The width of each foil section at the intermediate variable concave section 1122 is no less than about 10% of the chord length at the foil section.

The changes to the shape of the foil along its span strengthen the foil in the vicinity of the mount end and provide interior volume to accommodate bearings etc. at the mount end. It has been found that this adjustment is not measurably detrimental to the performance of the turbine and may contribute to the formation and persistence of the desirable low-pressure lift area on the surface of the foil.

Water turbines of the present invention may conveniently be made from polypropylene-fibre-reinforced concrete. It has been found that this is a relatively inexpensive and easy-to-work-with material that produces an adequately strong water turbine. Selection of a suitable light-weight aggregate can produce a turbine that has close to neutral buoyancy, making installation and servicing of such turbines easier. It is understood that polypropylene-fibre-reinforced concrete is a suitable material for water turbines of at least a span of about four meters and diameter of about two metres.

Wind turbines of the present invention may conveniently be made using conventional fibreglass manufacturing. For strength and some manufacturing convenience, fibreglass foils may have conventional foam cores. However, it will be apparent to those skilled in the art that wind turbine foils may be made in many different ways. For example, it has been found that a light, sufficiently robust and relatively inexpensive turbine may be made with cedar strip construction utilizing plywood frames.

What is claimed is:

1. A turbine, for rotating responsive to a fluid flowing relative to the turbine wherein in use the turbine is oriented with its axis of rotation transverse to the fluid flow, the turbine comprising:
    at least two foils extending along the axis of rotation, wherein:
    a) each foil has a mount end at one end of its span and a non-mount end at the other end of its span;
    b) each foil has a twist about the axis of rotation of no less than about 180° along its span;
    c) one side of the foil section of each foil is generally concave and the other side of the foil section of the foil has an outer convex section, an intermediate concave section and an inner convex section; and
    d) the length of the chord of the foil in the vicinity of the mount end is greater than the length of the chord of the foil in the vicinity of the non-mount end, whereby the profile of the turbine is generally tapered.

2. The turbine of claim 1, wherein the turbine is a solid-foil turbine whereby there is no overlap or gap between the foils.

3. The turbine of claim 2, wherein the foils project from a base at the mount end of the foils and the base is quasi-conical.

4. The turbine of claim 2, wherein the width of a foil section of each foil at the intermediate concave section is no less than about 10% of the chord length at the foil section.

5. The turbine of claim 2, wherein the greatest dimension of the inner convex section as measured from a chord between the axis of rotation of the turbine and the outer edge of the foil is at a location normal to a location on the chord within about 12% of the chord length of the axis of rotation.

6. The turbine of claim 2, wherein the ratio of the length to the width of a foil section in the vicinity of the mount end is greater than the ratio of the length to the width of a foil section in the vicinity of the non-mount end.

7. The turbine of claim 1, wherein the non-mount end of the turbine is tilted downstream with the turbine axis of rotation in the range of about 5° to 15° from perpendicular to the flow direction.

8. The turbine of claim 7, wherein the turbine axis of rotation is in the range of about 7° from perpendicular to the flow direction.

9. The turbine of claim 1, wherein the taper is linear.

10. The turbine of claim 1, wherein the taper is curved.

11. The turbine of claim 1, wherein the taper is double curved.

12. A turbine, for rotating responsive to a fluid flowing relative to the turbine wherein in use the turbine is oriented with its axis of rotation transverse to the fluid flow, the turbine comprising:
    at least two foils extending along the axis of rotation, wherein:
    a) each foil has a mount end at one end of its span and a non-mount end at the other end of its span;
    b) each foil has a twist about the axis of rotation of no less than about 180° along its span;
    c) one side of the foil section of each foil is generally concave and the other side of the foil section of the foil has an outer convex section, an intermediate concave section and an inner convex section;

d) the length of the chord of the foil in the vicinity of the mount end is greater than the length of the chord of the foil in the vicinity of the non-mount end, whereby the profile of the turbine comprises an un-tapered portion and at least one tapered portion; and e) the un-tapered portion of the turbine profile is configured such that the three dimensional volume swept by the un-tapered portion is cylindrical.

13. The turbine of claim 1, wherein the twist is about 200° to about 220°.

14. The turbine of claim 1, wherein the twist is about 210°.

15. The turbine of claim 1, wherein the turbine is a water turbine made from concrete.

16. The turbine of claim 15, wherein the concrete is reinforced with polypropylene.

17. The turbine of claim 1, wherein the turbine is a wind turbine made from fibreglass.

18. The turbine of claim 1, wherein the turbine has a foam core.

19. The turbine of claim 1, wherein the turbine is a wind turbine made from cedar strips over wood frames.

20. The turbine of claim 2, wherein the non-mount end of the turbine is tilted downstream with the turbine axis of rotation in the range of about 5° to 15° from perpendicular to the flow direction.

21. The turbine of claim 20, wherein the turbine axis of rotation is in the range of about 7° from perpendicular to the flow direction.

\* \* \* \* \*